United States Patent
Wahaj Arshad et al.

(10) Patent No.: US 12,295,059 B2
(45) Date of Patent: May 6, 2025

(54) HANDLING OF LOGGED MINIMIZATION DRIVE TEST CONFIGURATIONS IN DUAL CONNECTIVITY SCENARIO

(71) Applicant: Telefonaktiebolaget LM Ericsson (PUBL), Stockholm (SE)

(72) Inventors: Malik Wahaj Arshad, Stockholm (SE); Pradeepa Ramachandra, Linköping (SE); Wei Shen, Linköping (SE); Robert Petersen, Linköping (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 356 days.

(21) Appl. No.: 17/634,683

(22) PCT Filed: Jun. 25, 2020

(86) PCT No.: PCT/SE2020/050659
§ 371 (c)(1),
(2) Date: Feb. 11, 2022

(87) PCT Pub. No.: WO2021/029800
PCT Pub. Date: Feb. 18, 2021

(65) Prior Publication Data
US 2022/0272587 A1    Aug. 25, 2022

Related U.S. Application Data

(60) Provisional application No. 62/886,105, filed on Aug. 13, 2019.

(51) Int. Cl.
*H04W 36/00* (2009.01)
*H04W 76/27* (2018.01)
*H04W 36/14* (2009.01)

(52) U.S. Cl.
CPC ....... *H04W 76/27* (2018.02); *H04W 36/0055* (2013.01); *H04W 36/0058* (2018.08);
(Continued)

(58) Field of Classification Search
CPC ............. H04W 36/0069; H04W 76/27; H04W 36/0058
See application file for complete search history.

(56) References Cited

U.S. PATENT DOCUMENTS

| 9,210,585 B2 | 12/2015 | Futaki et al. | |
| 2013/0288664 A1* | 10/2013 | Bodog | H04W 24/10 455/422.1 |

(Continued)

FOREIGN PATENT DOCUMENTS

| CN | 105453635 A | 3/2016 |
| CN | 107006051 A | 8/2017 |

(Continued)

OTHER PUBLICATIONS

3GPP TR 36.805 v9.0.0; Technical Report; 3rd Generation Partnership Project; Technical Specification Group Radio Access Network; Study on Minimization of drive-tests in Next Generation Networks (Release 9)—Dec. 2009.

(Continued)

*Primary Examiner* — Shukri Taha
(74) *Attorney, Agent, or Firm* — Baker Botts L.L.P.

(57) ABSTRACT

A method (1200) performed by a wireless device (110) includes receiving (1202), from a network node (160), a Minimization of Drive Test, MDT, configuration for a master cell group, MCG, and a secondary cell group, SCG. While the wireless device is in an idle state or an inactive state and operating according to a first Radio Access Technology, RAT, the wireless device logs (1204) MDT measurements for the MCG and the SCG based on the MDT (Continued)

configuration. After transitioning from the idle or inactive state to a connected state and after handover from a source cell associated with the first RAT to a target cell associated with a second RAT, the wireless device transmits (1206) at least one MDT report to a target network node associated with the target cell.

12 Claims, 21 Drawing Sheets

(52) U.S. Cl.
CPC ...... *H04W 36/00698* (2023.05); *H04W 36/13* (2023.05); *H04W 36/142* (2023.05)

(56) References Cited

U.S. PATENT DOCUMENTS

| | | | | |
|---|---|---|---|---|
| 2017/0208491 | A1* | 7/2017 | Xu | H04W 24/10 |
| 2021/0067998 | A1* | 3/2021 | Li | H04W 72/04 |
| 2023/0103126 | A1* | 3/2023 | Liu | H04W 36/0079 |
| | | | | 370/311 |

FOREIGN PATENT DOCUMENTS

| | | | | |
|---|---|---|---|---|
| EP | 2 579 641 | A2 | 4/2013 | |
| WO | WO-2010145531 | A1 * | 12/2010 | ............ H04W 24/10 |
| WO | WO-2015062250 | A1 * | 5/2015 | ............ H04W 24/08 |
| WO | 2015 168861 | A1 | 11/2015 | |
| WO | WO-2020164082 | A1 * | 8/2020 | ............ H04W 24/02 |

OTHER PUBLICATIONS

3GPP TS 37.320 v15.0.0; Technical Specification; 3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 15)—Jun. 2018.
3GPP TSG-RAN WG2 Meeting #105; Athens, Greece; Source: ZTE Corporation, Sanechips; Title: Discussion on use cases of MDT (R2-1900669)—Feb. 25-Mar. 1, 2019.
3GPP TSG-RAN WG2 #106; Reno, USA; Source: Ericsson; Title: NR and LTE serving cell measurement logging in logged MDT (TDoc R2-1906889)—May 13-17, 2019.
3GPP TSG RAN WG2 Meeting #106; Reno, Nevada; Source: Ericsson; Title: Dual Connectivity Handling in MDT—email discussion summary (R2-1906890)—May 13-17, 2019.
PCT International Search Report issued for International application No. PCT/SE2020/050659—Sep. 28, 2020.
PCT Written Opinion of the International Searching Authority issued for International application No. PCT/SE2020/050659—Sep. 28, 2020.
Notice of First Review issued for Chinese Application Serial No. 202080071606.8—Mar. 30, 2024.
3GPP TSG-RAN WG2 Meeting #105, Athens, Greece, Feb. 25-Mar. 1, 2019; Source: ZTE Corporation, Sanechips; Title: Discussion on use cases of MDT; Agenda item: 11.12.2 (R2-1900669).
Notice of Allowance issued for Chinese Patent Application No. 202080071606.8—Mar. 13, 2025

* cited by examiner

HANDLING OF LOGGED MINIMIZATION DRIVE TEST CONFIGURATIONS IN DUAL CONNECTIVITY SCENARIO

PRIORITY

This nonprovisional application is a U.S. National Stage Filing under 35 U.S.C. § 371 of International Patent Application Serial No. PCT/SE2020/050659 filed Jun. 25, 2020 and entitled "Handling of Logged Minimization Drive Test Configurations in Dual Connectivity Scenario" which claims priority to U.S. Provisional Patent Application No. 62/886,105 filed Aug. 13, 2019 both of which are hereby incorporated by reference in their entirety.

TECHNICAL FIELD

The present disclosure relates, in general, to wireless communications and, more particularly, systems and methods for handling of logged minimization drive test (MDT) configurations in dual connectivity (DC) scenarios.

BACKGROUND

Minimization Drive Tests (MDT) was firstly studied in Rel-9 (TR 36.805) driven by RAN2 with the purpose of minimizing the actual drive tests. MDT has been introduced since Rel-10 in LTE. MDT has not been specified for New Radio (NR) in the involved standards in RAN2, RAN3 and SA5 groups.

The use cases in the 3GPP TR 36.805 include: coverage optimization, mobility optimization, capacity optimization, parameterization for common channels, and Quality of Service (QOS) verification.

Why not normal Radio Resource Management (RRM)? The normal radio resource management (RRM) mechanisms only allow for measurements to be reported when the user equipment (UE) has radio resource control (RRC) connection with the particular cell, and there is sufficient uplink (UL) coverage to transport the measurement report. This will restrict measurements to be collected from UEs not experiencing radio link failure (RLF) and experiencing sufficient UL coverage. Besides, there is no accompanying location information in normal RRM measurements.

When MDT was introduced in Rel-10, it was decided to include MDT as a part of the Trace function which is able to provide very detailed logging data at call level. Based on the methods of activating/deactivating trace and trace configuration, the trace function can be classified into the following two aspects.

Management activation/deactivation: Trace Session is activated/deactivated in different Network Elements (NE) directly from the Element Manager (EM) using the management interfaces of those NEs.

Signalling Based Activation/Deactivation: Trace Session is activated/deactivated in different NEs using the signalling interfaces between those elements so that the NEs may forward the activation/deactivation originating from the EM.

FIG. 1 summarizes the classification of the MDT. As depicted, the MDT can be classified as Area-based MDT and Signalling-based MDT from the use case perspective:

Area-based MDT: MDT data is collected from UEs in a specified area. The area is defined as a list of cells (Universal Terrestrial Radio Access Network (UTRAN) or Evolved-UTRAN (E-UTRAN)) or as a list of tracking/routing/location areas. The area-based MDT is an enhancement of the management-based trace functionality. Area-based MDT can be either a logged MDT or Immediate MDT.

Signalling-based MDT: MDT data is collected from one specific UE. The UE that is participating in the MDT data collection is specified as International Mobile Equipment Identity (Software Version) (IMEI (SV)) or as International Mobile Subscriber Identifier (IMSI). The signalling-based MDT is an enhancement of the signalling based subscriber and equipment trace. The signalling-based MDT can be either a logged MDT or Immediate MDT.

In Long Term Evolution (LTE), for Area based MDT, the MDT control and configuration parameters are sent by the Network Management directly to the eNodeB (eNB). Then, the eNB selects UEs which fulfil the criteria including the area scope and the user consent and starts the MDT. For signaling-based MDT, i.e., UE-specific MDT, the MDT control and configuration parameters are sent by the Network Management to Mobility Management Entity (MME), which then forwards the parameters to eNB associated with the specific UE.

Furthermore, as illustrated in FIG. 1, there are two more classifications of MDT:

Immediate MDT: MDT data is collected when the UE is in active state. The MDT request is taken care of by the NE.

Logged MDT: MDT data is collected when the UE is in idle state. The MDT request is taken care of by the UE.

The Logged MDT measurements are tagged by the UE with location data in the following manner:

Evolved Cell Global Identifier (ECGI) or Cell-Identifier (Cell-Id) of the serving cell when the measurement was taken is always included.

Detailed location information (e.g. Global Navigation Satellite System (GNSS) location information) is included if available in the UE when the measurement was taken. If detailed location information is available, the reporting shall consist of latitude and longitude. Depending on availability, altitude, uncertainty and confidence may be also additionally included. UE tags available detailed location information only once with upcoming measurement sample, and then the detailed location information is discarded, i.e. the validity of detailed location information is implicitly assumed to be one logging interval.

For Immediate MDT, the M1 measurements are tagged by the UE with location data in the following manner:

Detailed location information (e.g. GNSS location information) is included if available in the UE when the measurement was taken. If detailed location information is available, the reporting shall consist of latitude and longitude. Depending on availability, altitude, uncertainty and confidence may be also additionally included.

The UE should include the available detailed location information only once. If the detailed location information is obtained by GNSS positioning method, GNSS time information shall be included. For both event-based and periodic reporting, the detailed location information is included if the report is transmitted within the validity time after the detailed location information was obtained. The validity evaluation of detailed location information is left to UE implementation.

With regard to user consent handling, for signalling based MDT, the Core Network (CN) shall not initiate MDT towards a particular user unless the user consent is available.

For area-based MDT, the CN indicates to the Radio Access Network (RAN) whether MDT is allowed to be configured by the RAN for this user considering, e.g. user consent and roaming status, by providing management-based MDT allowed information consisting of the Management Based MDT Allowed indication and optionally the Management Based MDT Public Land Mobile Network (PLMN) List. The management-based MDT allowed information propagates during inter-PLMN handover if the Management Based MDT PLMN List is available and includes the target PLMN.

The same user consent information can be used for area-based MDT and for signaling-based MDT, i.e. there is no need to differentiate the user consent per MDT type. Collecting the user consent shall be done via customer care process. The user consent information availability shall be considered as part of the subscription data and as such this shall be provisioned to the Home Subscriber Server (HSS) database.

FIG. 2 illustrates the multiple Architecture Options available in Release 15 relating to Dual Connectivity (DC). Currently, release 15 supports up to 7 Architecture options which includes both stand alone and non-standalone scenarios. This disclosure focuses on the Architecture options supporting DC and potential support of MDT in those options, specifically:

Option 3: E-UTRA-NR DC (EN-DC)
Option 4: NR-EUTRA DC (NE-DC)
Option 7: Next Generation-EUTRA-NR DC (NGEN-DC)

As part of Multi-Radio Access Technology DC (MR-DC) configuration, each UE is configured with two separate scheduled cell groups namely:

Master Cell Group (MCG)
Secondary Cell Group (SCG)

MCG belongs to the master node (MN) and SCG belongs to the slave or secondary node (SN). Based on the MR-DC type, MN and SN could either be LTE cells or NR cells.

An important aspect to understand in MR-DC is the bearer termination options. FIG. 3 illustrates the bearer types based on termination points. There are mainly two types of bearer termination in MR-DC, namely:

MN terminated bearer: in MR-DC, a radio bearer for which Packet Data Convergence Protocol (PDCP) is located in the MN.
SN terminated bearer: in MR-DC, a radio bearer for which PDCP is located in the SN.

This is an important aspect since it would also decide how the network would configure the UE with MDT configuration in MR-DC scenarios.

When it comes to MDT support in DC scenarios, a few basic considerations should be considered, such as, specifically:

Visibility of DC configuration to the Operations Administration & Maintenance (OAM) and impact on MDT configuration.
Configuration of MDT configuration to UE via MN, SN or both
Trigger type support in MDT for MR-DC Visibility of DC configuration to the OAM and impact on MDT configuration may be considered. DC is need based and configured by the RAN nodes on case by case and UE support basis. OAM is aware about the support for DC in a specific RAN node but OAM does not have visibility about the DC configuration on individual UE. So, to support MDT configuration with DC, OAM needs to provide MDT configuration including configuration for secondary cell group (SCG) cells based on RAN support rather than support of individual UE.

Configuration of MDT configuration to UE may be provided via MN, SN or both.

The next important aspect is how the MDT configuration with DC consideration is send to the UE. Before assessing the configuration option for MDT in MR-DC scenarios, it is important to assess the measurement quantities currently available in MDT for both logged and immediate MDT as shown in Table 2 below.

Logged MDT only involves UE specific measurements but Immediate MDT involves measurements from both UE and the RAN node, specifically measurements M4-M7 are specific to RAN node.

Thus, specifically for Immediate MDT in MR-DC, we need to configure both RAN nodes contribute towards calculating the MDT measurements.

Now, if the options available to configure the MDT on UE in MR-DC scenarios are considered, there are multiple options available:

1. MDT configuration is always provided by MN
2. MDT configuration for MN is provided by MN and SN provides its respective configuration to the UE
3. Flexible approach for MDT configuration in DC scenarios where SN can be configured to provide MDT configuration based on network preference The first option that the complete MDT configuration including DC aspect is always provided by MN is the simplest approach since it avoids the complexity to coordinate between MN and SN on which node would configure the MDT configuration for SN towards the UE. There are some potential issues in case of MN configuring reports for SN on UE including:

MN needs to provide MDT configuration for SN, potentially on another Radio Access Technology (RAT), i.e. NE-DC or EN-DC scenarios. The trigger conditions and the configuration parameters could be different in this case which needs to be supported by MN.
In case of SN terminated bearer, Signalling Radio Bearer (SRB) is terminated directly on the SN so in this case, the measurements M4-M7 needs to be specifically measured at SN since the PDCP for SN is separate from MN. If the SN need to report these measurements to MN always, it involves extra overhead in MN-SN signaling and coordination. It might be applicable in split bearer scenario that part of M4-M7 can be measured in the MN since the PDCP is located in MN but then we need to have a separate implementation for both split bearer and SN terminated bearer.

The second and third option provides more flexibility in terms of MN and SN coordination and also cover the scenario of SN terminated bearer measurements. In this case, MN and SN can perform MDT measurements independently but at the cost of more complexity in terms of MN-SN coordination for MDT configuration and also sharing SN MDT reports with MN.

In case of only MN providing configuration for both MN and SN, MN needs to coordinate with SN for collecting measurements M4-M7 in case of SN terminated bearer while it would receive the measurements M1, M2, M3m M8 and M9 directly from the UE. This would require extra complexity since, depending on if it is split bearer or SN terminated bearer, MN needs to collect different measurements from SN and then merge it into measurements received for SN from UE.

Trigger Type Support in MDT for MR-DC

Another aspect to consider is the support for SN related measurements during logged measurements. First a brief overview of the types of MDT based on RRC state.

MDT Types Based on RRC States: Logged MDT and Immediate MDT

In general, there are two types of MDT measurement logging, i.e., Logged MDT and Immediate MDT.

Logged MDT

A UE is configured to perform periodical MDT logging during RRC_IDLE state after receiving the MDT configurations from the network. The UE shall report the downlink (DL) pilot strength measurements (Reference Symbol Received Power (RSRP)/Reference Symbol Received Quality (RSRQ)) together with time information, detailed location information if available, and Wide Local Access Network (WLAN), Bluetooth to the network using the UE information framework when it moves back to RRC_CONNECTED state. The DL pilot strength measurement of Logged MDT is collected based on the existing measurements required for cell reselection purpose, without imposing UE to perform additional measurements. Table 1 summarizes the measurement logging for Logged MDT.

TABLE 1

| MDT mode | RRC states | Measurement quantities |
| --- | --- | --- |
| Logged MDT | RRC_IDLE | RSRP and RSRQ of the serving cell and available UE measurements for intra-frequency/inter-frequency/inter-RAT, time stamp and detailed location information if available. |

Immediate MDT

Measurements for Immediate MDT purpose can be performed by RAN and UE. There are a number of measurements (M1-M9 defined in TS 37.320) which are specified for RAN measurements and UE measurements. For UE measurements, the MDT configuration is based on the existing RRC measurement procedures for configuration and reporting with some extensions for location information.

The measurement quantities for Immediate MDT are shown in Table 2.

and NR (secondary cell) simultaneously, with trigger coming from EPC.

Option 4 (aka NE-DC): This option involves support for configuration of MDT in both NR (master cell) and E-UTRA (secondary cell) simultaneously, with trigger coming from 5GC. This option is a more natural step to start in terms of DC scenario support since it is an evolution of the current standardization activity for MDT in 5GC and NR as a priority.

Option 7 (aka NGEN-DC): This option is unique in the sense that it covers 5G core as well as E-UTRA which complicates in the sense that we cannot reuse the 5GC MDT triggers agreed for NR since it would contain beam specific configuration as well as the legacy LTE mechanism cannot be used since that is based on EPC.

Certain problems exist. For example, currently, MDT configuration and reporting is performed only for a single radio access technology in DC scenarios. In Release 14 for LTE and Release 15 for NR alone and with E-UTRA, DC support was added in $3^{rd}$ Generation Partnership Project (3GPP) specification, which allows the UE to actually have DL and UL transmission with two or multiple cells simultaneously.

In the current specification, there is no provision to provide separate Trace Collections Entity (TCE) from MCG and SCG in logged MDT in both single Radio Access Technology (RAT) and multi RAT scenarios.

In Release 15, the network has the flexibility to configure, reconfigure or deconfigure SCG on a UE. MDT behavior for both logged and immediate MDT reporting during variation of SCG configuration is undefined.

The area in which the UE is supposed to log the measurements is configured as part of the area configuration. In

TABLE 2

| MDT mode | RRC states | Measurement quantities |
| --- | --- | --- |
| Immediate MDT | RRC_CONNECTED | M1: RSRP and RSRQ measurement by UE.<br>M2: Power Headroom measurement by UE.<br>M3: Received Interference Power measurement by eNB.<br>M4: Data Volume measurement separately for DL and UL, per QCI per UE, by eNB.<br>M5: Scheduled IP Throughput for MDT measurement separately for DL and UL, per RAB per UE and per UE for the DL, per UE for the UL, by eNB.<br>M6: Packet Delay measurement, separately for DL and UL, per QCI per UE, see UL PDCP Delay, by the UE, and Packet Delay in the DL per QCI, by the eNB.<br>M7: Packet Loss rate measurement, separately for DL and UL per QCI per UE, by the eNB.<br>M8: RSSI measurement by UE.<br>M9: RTT measurement by UE. |

Currently, the UE only measures on the MN cell when it is in Inactive or Idle state so the SN configuration during logged measurements does not add any value.

Based on the above considerations, the multiple DC scenarios for Release 15 are assessed:

Option 3 (aka EN-DC): This option involves support for configuration of MDT in both E-UTRA (master cell)

the existing AreaConfiguration IE in the LoggedMeasurementConfiguration, the UE can be instructed to perform logging of the measurements when the UE camps in the cell, which is part of the areaConfiguration. This can be seen as a limitation in scenarios when the UE camps in a neighbor cell and it can perform measurements on the cells listed in the areaConfiguration but it cannot log in the logged measurements. Especially in the case of non-standalone (NSA) deployment wherein the UEs are not allowed to camp on those cells, the network cannot get logged MDT measurements from these cells as the UEs will never camp there.

SUMMARY

Certain aspects of the present disclosure and their embodiments may provide solutions to these or other challenges.

According to certain embodiments, a method by a wireless device includes receiving, from a network node, a Minimization of Drive Test (MDT) configuration for a master cell group (MCG) and a secondary cell group (SCG). While the wireless device is in an idle state or an inactive state and operating according to a first Radio Access Technology (RAT), the wireless device logs MDT measurements for the MCG and the SCG based on the MDT configuration. After transitioning from the idle or inactive state to a connected state and after handover from a source cell associated with the first RAT to a target cell associated with a second RAT, the wireless device transmits at least one MDT report to a target network node associated with the target cell.

According to certain embodiments, a method by a wireless device includes, while operating in a first cell, applying a first MDT configuration for performing and logging MDT measurements. The first MDT configuration includes at least one of a first master node (MN) MDT configuration and a first secondary node (SN) MDT configuration. The wireless device performs cell reselection from the first cell to a second cell. After performing the cell reselection to the second cell, the wireless device receives a second MDT configuration and takes at least one action to replace at least a portion of the first MDT configuration with the second MDT configuration.

According to certain embodiments, a method by a network node operating as a target network node after a handover of a wireless device from a source cell to a target cell associated with the target network node includes receiving at least one MDT report from the wireless device. The at least one MDT report includes at least one MDT measurement, and the at least one MDT measurement is logged and/or performed based on a MDT configuration for a MCG and a SCG. The MDT configuration is associated with the source cell prior to handover of the wireless device.

According to certain embodiments, a wireless device includes processing circuitry configured to receive, from a network node, a MDT configuration for a MCG and a SCG. While the wireless device is in an idle state or an inactive state and operating according to a first RAT, the wireless device logs MDT measurements for the MCG and the SCG based on the MDT configuration. After transitioning from the idle or inactive state to a connected state and after handover from a source cell associated with the first RAT to a target cell associated with a second RAT, the wireless device transmits at least one MDT report to a target network node associated with the target cell.

According to certain embodiments, a wireless device includes processing circuitry configured to apply a first MDT configuration for performing and logging MDT measurements while operating in a first cell. The first MDT configuration includes at least one of a first MN MDT configuration and a first SN MDT configuration. The processing circuitry is configured to perform cell reselection from the first cell to a second cell. After performing the cell reselection to the second cell, the processing circuitry is configured to receive a second MDT configuration and take at least one action to replace at least a portion of the first MDT configuration with the second MDT configuration.

According to certain embodiments, a network node operating as a target network node after a handover of a wireless device from a source cell to a target cell associated with the target network node includes processing circuitry configured to receive at least one MDT report from the wireless device. The at least one MDT report includes at least one MDT measurement, and the at least one MDT measurement is logged and/or performed based on a MDT configuration for a MCG and a SCG. The MDT configuration is associated with the source cell prior to handover of the wireless device.

Certain embodiments may provide one or more of the following technical advantages. For example, one technical advantage may be that certain embodiments provide methods, systems, and technique for configuring TCE index in logged MDT for SCG on multiple RATs. As another example, a technical advantage may be that certain embodiments provide methods, systems, and techniques for reporting the management node with cause for de/reconfiguration of SCG on a UE. As still another example, a technical advantage may be that methods, systems, and techniques are provided for a UE to handle MDT reporting during scenarios with reconfiguration or deconfiguration of SCG.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
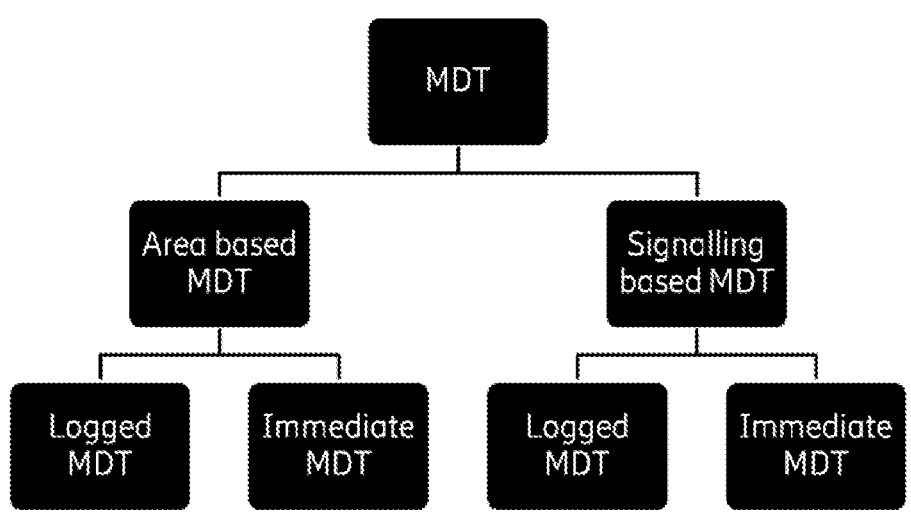
FIG. 1 summarizes the classification of the MDT.
Figure 2:
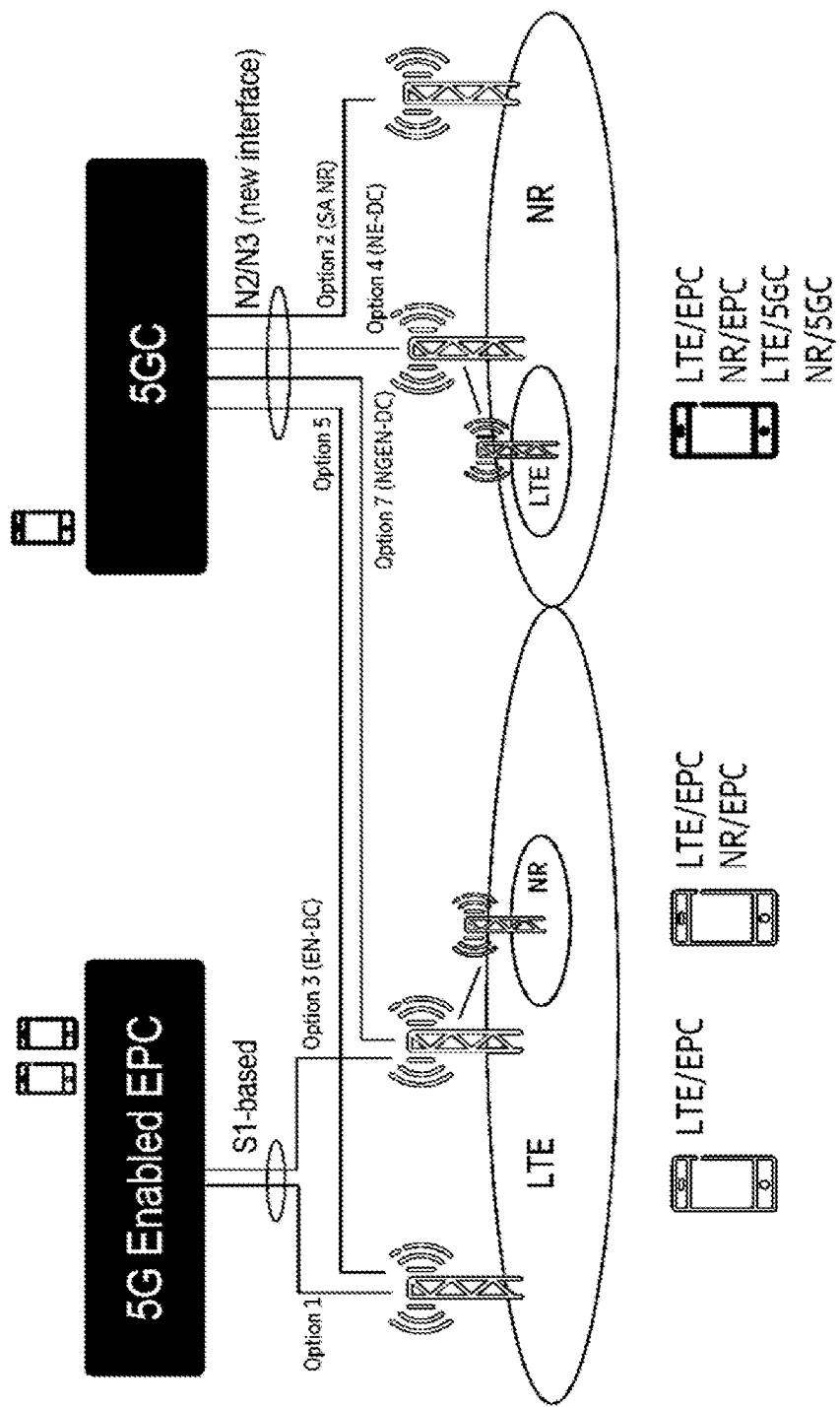
FIG. 2 illustrates the multiple Architecture Options available in Release 15 relating to Dual Connectivity (DC)
Figure 3:
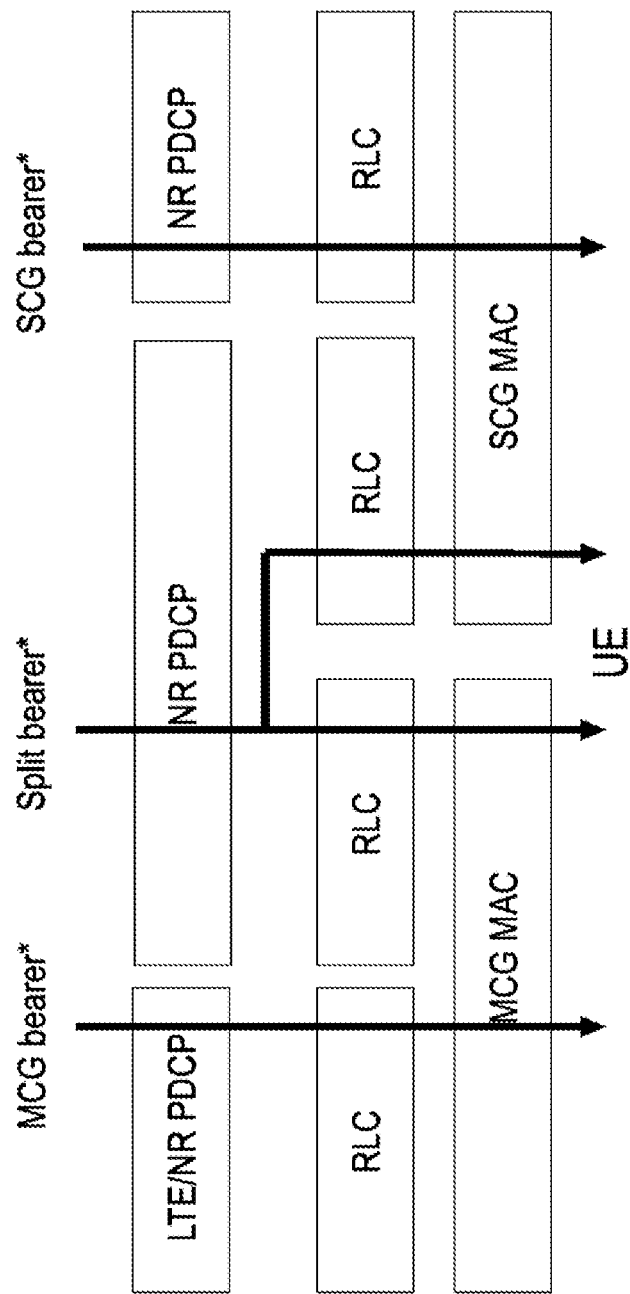
FIG. 3 illustrates the bearer types based on termination points

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In some embodiments, a more general term "network node" may be used and may correspond to any type of radio network node or any network node, which communicates with a UE (directly or via another node) and/or with another network node. Examples of network nodes are NodeB, MeNB, ENB, a network node belonging to MCG or SCG, base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node (e.g. Mobile Switching Center (MSC), MME, etc.), Operations and Maintenance (O&M), Operations Support System (OSS), Self Optimized Network (SON), positioning node (e.g. Evolved-Serving Mobile Location Center (E-SMLC)), MDT, test equipment (physical node or software), etc.

In some embodiments, the non-limiting term user equipment (UE) or wireless device may be used and may refer to any type of wireless device communicating with a network node and/or with another UE in a cellular or mobile communication system. Examples of UE are target device, device to device (D2D) UE, machine type UE or UE capable of machine to machine (M2M) communication, Personal Digital Assistant (PDA), Tablet, mobile terminals, smart phone, laptop embedded equipped (LEE), laptop mounted equipment (LME), Unified Serial Bus (USB) dongles, UE category M1, UE category M2, Proximity Services (ProSe) UE, Vehicle-to-Vehicle (V2V) UE, Vehicle-to-Anything (V2X) UE, etc.

Additionally, terminologies such as base station/gNodeB and UE should be considered non-limiting and do in particular not imply a certain hierarchical relation between the two; in general, "gNodeB" could be considered as device 1 and "UE" could be considered as device 2 and these two devices communicate with each other over some radio channel. And in the following the transmitter or receiver could be either gNB, or UE.

According to certain embodiments, systems, methods, and techniques are provided to enable RAN nodes to enhance the MDT configurations for dual connectivity scenarios including but not limited to

EN-DC

NE-DC

NG-EN-DC

NR NR DC

E-UTRA E-UTRA DC

According to certain embodiments, methods, systems, and techniques are provided for configuration and reporting of logged MDT or Secondary Cell Group (SCG) in multiple UE mobility scenarios. Also methods, systems, and techniques are defined for defining UE behavior for handling change in SCG configuration.

For example, according to certain embodiments, a method is provided for configuring the MDT measurements for SGCs along with the master cells group in case of DC scenarios. This includes mechanism(s) for OAM/node triggering MDT to configure the MDT trigger towards RAN indicating the requirement for MDT measurements from SCG.

According to certain embodiments, a mechanism is also provided for the RAN node to handle the MDT trigger from OAM/node triggering MDT in CU-DU split architecture as well as coordination of the MDT configuration between Master and Slave node.

According to certain embodiments, a mechanism is also provided for the UE to report the MDT measurements for the master and SCGs.

According to certain embodiments, an enhanced mechanism is provided for configuring multiple TCE index to the UE in lobbed MDT scenario. Additionally, methods, systems, and technique are provided for reporting the cause for the de/reconfiguration of SCG.

According to certain embodiments, methods, systems, and technique are provided for handling MDT logging by UE if the SCG is reconfigured to a new cell/cells or if the SCG is de configured.

According to certain embodiments, methods, systems, and techniques are provided for the configuration of an area (either as list of cells or frequencies etc.) wherein the UE shall perform logging of the measurements even when the UE is not camping in any of the cells in the so configured area but as long as the UE has measurements from so configured area.

Certain embodiments relate to configuration and reporting of SCG cells in logged MDT. For example, according to certain embodiments, if an idle or inactive UE configured with logged MDT for MSG and SCG comes back in a neighboring cell, it would report the combined logged MDT report of source cell to the target cell. The target RAN node would then forward the logged MDT report to the mapped TCE from TCE index as in legacy MDT.

In another variation of above embodiment, the source cell may provide two indexes for trace collection entities towards the UE during configuration of logged MDT, one for the MCG and one for the SCG. When an idle or inactive UE, configured with logged MDT for MCG and SCG comes back in a neighboring cell, it would report the logged MDT for MSG and SCG separately along with their respective index of trace collection entity. The target RAN node would then forward the logged MDT report for MCG and SCG separately to the respective mapped TCE from TCE index.

Certain embodiments relate to MDT reporting with Deconfiguration and Reconfigurations of SCG cell on UE. For example, according to certain embodiments, when an SCG cell is reconfigured or de configured on a UE while there is an active immediate MDT session, a RAN node provides an indicator of reason towards the management nodes for reconfiguring or de configuring the SCG on UE. The reasons could include but not limited to:
- Not enough data required by UE
- UE out of coverage of another SCG cells
- Other UE's with higher priority for SCG cells is camped on cell.

According to certain embodiments, a RAN node may never deconfigure the SCG on a UE while there is an associated MDT configuration active on that UE.

According to certain embodiments, an immediate MDT session is automatically deleted by a UE if the RAN node re/de configures the SCG on a UE.

According to certain embodiments, if the UE is in Inactive or Idle State while being configured for logged MDT from SCG and it eventually camps on cell where the specific SCG is not configured or supported, the UE can handle the SCG report according to one or more of the following methods,
- Discard the MDT report for SCG cells, or
- Report the MDT report of SCG cell to the MN which can then forward it to the de configured SCG cell, or
- Report the MDT report of SCG cell to the MN which can then forward it to the TCE directly based on the local mapping of the TCE index provided by UE According to certain embodiments, all the above embodiments cover all the possible MDT configurations types and associated subtypes including but not limited to
- Management/Area based MDT
- Signaling based MDT According to certain embodiments, all the above embodiments cover all the possible DC scenarios including but not limited to
- EN-DC
- NE-DC
- NG-EN-DC
- NR NR DC
- E-UTRA-E-UTRA DC According to certain embodiments, all the above embodiments also cover the MDT implementation in Carrier Aggregation scenario where the SCG (used for DC) would be replaced by a secondary cell providing Carrier Aggregation.

Figure 4:
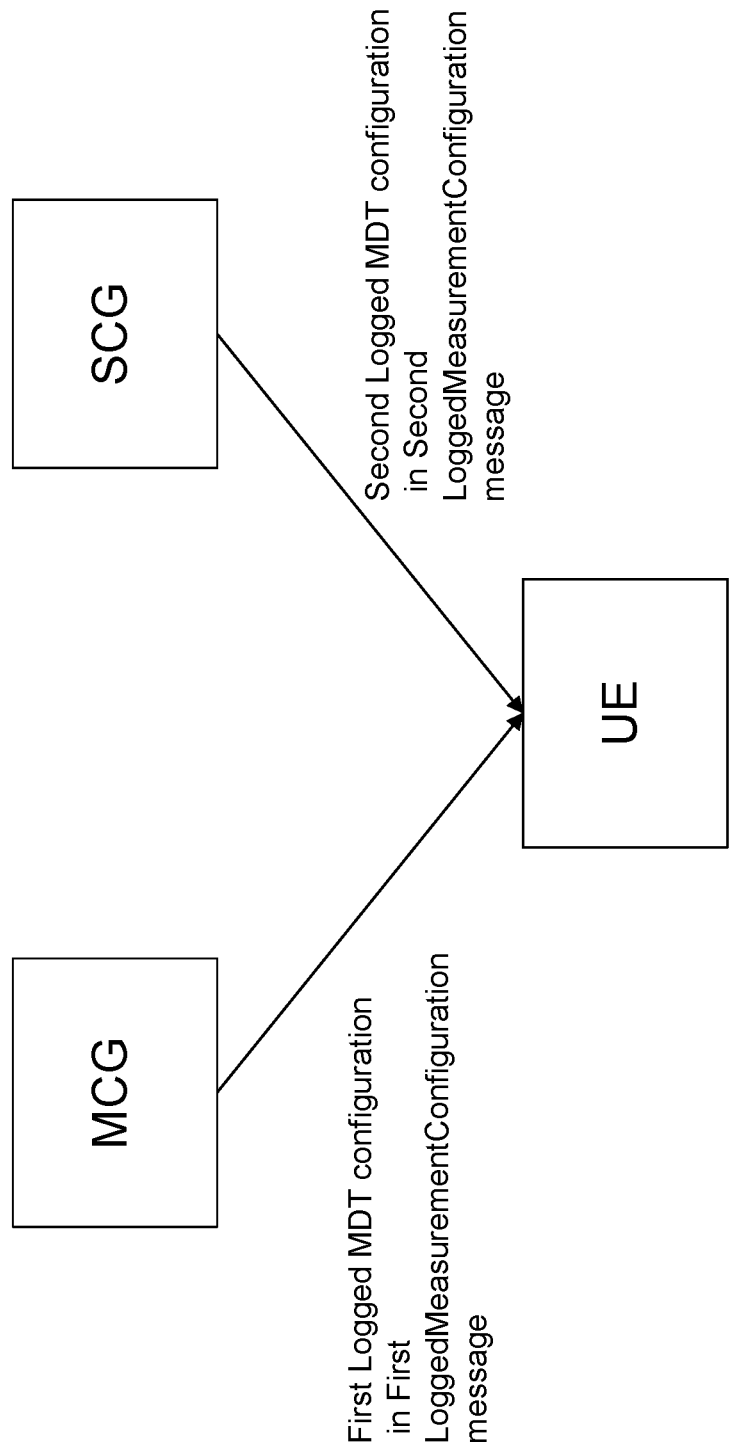
FIG. 4 illustrates a UE receiving a first logged MDT configuration in FirstLoggedConfiguration message from a MCG and a second logged MDT configuration in a SecondLoggedConfiguration message from a SCG, according to certain embodiments.

FIG. 4 illustrates a UE receiving a first logged MDT configuration in FirstLoggedConfiguration message from a MCG and a second logged MDT configuration in a SecondLoggedConfiguration message from a SCG, according to certain embodiments.

In one example, the UE receives the first MDT configuration as follows:

(First) LoggedMeasurementConfiguration message

```
-- ASN1START
LoggedMeasurementConfiguration-r10 ::=      SEQUENCE {
    criticalExtensions                      CHOICE {
        c1                                  CHOICE {
            loggedMeasurementConfiguration-r10    LoggedMeasurementConfiguration-r10-IEs,
            spare3 NULL, spare2 NULL, spare1 NULL
        },
        criticalExtensionsFuture            SEQUENCE { }
    }
}
LoggedMeasurementConfiguration-r10-IEs::= SEQUENCE {
    traceReference-r10                  TraceReference-r10,
    traceRecordingSessionRef-r10        OCTET STRING (SIZE (2)),
    tce-Id-r10                          OCTET STRING (SIZE (1)),
    absoluteTimeInfo-r10                AbsoluteTimeInfo-r10,
    areaConfiguration-r10               AreaConfiguration-r10           OPTIONAL,    -- Need OR
    loggingDuration-r10                 LoggingDuration-r10,
    loggingInterval-r10                 LoggingInterval-r10,
    nonCriticalExtension                LoggedMeasurementConfiguration-v1080-IEs                OPTIONAL
}
LoggedMeasurementConfiguration-v1080-IEs ::= SEQUENCE {
    lateNonCriticalExtension-r10        OCTET STRING                                            OPTIONAL,
    nonCriticalExtension                LoggedMeasurementConfiguration-v1130-IEs                OPTIONAL
}
```

| (First) LoggedMeasurementConfiguration message |
|---|

```
LoggedMeasurementConfiguration-v1130-IEs ::= SEQUENCE {
       plmn-IdentityList-r11            PLMN-IdentityList3-r11            OPTIONAL,        -- Need OR
       areaConfiguration-v1130          AreaConfiguration-v1130           OPTIONAL,        -- Need OR
       nonCriticalExtension             LoggedMeasurementConfiguration-v1250-IEs            OPTIONAL
}
LoggedMeasurementConfiguration-v1250-IEs ::= SEQUENCE {
       targetMBSFN-AreaList-r12         TargetMBSFN-AreaList-r12          OPTIONAL,        -- Need OP
       nonCriticalExtension             LoggedMeasurementConfiguration-v1530-IEs
       OPTIONAL
}
LoggedMeasurementConfiguration-v1530-IEs ::= SEQUENCE {
       bt-NameList-r15                  BT-NameList-r15                   OPTIONAL,        -- Need OR
       wlan-NameList-r15                WLAN-NameList-r15                 OPTIONAL,        -- Need OR
       nonCriticalExtension             SEQUENCE { }                      OPTIONAL
}
TargetMBSFN-Area-r12 ::=                         SEQUENCE (SIZE (0..maxMBSFN-Area)) OF TargetMBSFN-Area-r12
TargetMBSFN-Area-r12 ::=                         SEQUENCE {
       mbsfn-AreaId-r12                 MBSFN-AreaId-r12                  OPTIONAL,        -- Need OR
       carrierFreq-r12                  ARFCN-ValueEUTRA-r9,
       ...
}
-- ASN1STOP
```

In another example, the UE receives the second MDT configuration as follows:

| (Second) LoggedMeasurementConfigurationNR message |
|---|

```
-- ASN1START
-- TAG-LOGGEDMEASUREMENTCONFIGURATIONNR-START
LoggedMeasurementConfiguration-r16 ::= SEQUENCE {
       criticalExtensions               CHOICE {
           loggedMeasurementConfiguration        LoggedMeasurementConfiguration-r16-IEs,
           criticalExtensionsFuture              SEQUENCE { }
       }
}
LoggedMeasurementConfiguration-r16-IEs ::= SEQUENCE {
        traceReference-r16              TraceReference-r16,
        traceRecordingSessionRef-r16    OCTET STRING (SIZE (2)),
        tce-Id-r16                      OCTET STRING (SIZE (1)),
        absoluteTimeInfo-r16            AbsoluteTimeInfo-r16,
        areaConfiguration-r16           AreaConfiguration-r16
OPTIONAL,          --Need R
        subAreaConfiguration-r16                SubAreaConfiguration-r16
OPTIONAL,          --Need R
        loggingDuration-r16             LoggingDuration-r16,
        loggingInterval-r16             LoggingInterval-r16,
        plmn-IdentityList-r16           PLMN-IdentityList3-r16            OPTIONAL,        --Need R
        bt-NameList-r16                 BT-NameList-r16                   OPTIONAL,        --Need R
        wlan-NameList-r16               WLAN-NameList-r16                 OPTIONAL,        --Need R
        nonCriticalExtension            SEQUENCE { }
OPTIONAL
}
-- TAG-LOGGEDMEASUREMENTCONFIGURATIONNR-STOP
-- ASN1STOP
```

The AreaConfiguration indicates area for which UE is requested to perform measurement logging. If not configured, measurement logging is not restricted to specific cells or tracking areas but applies as long as the RPLMN is contained in plmn-IdentityList stored in VarLogMeasReport. An example AreaConfiguration information element follows:

| AreaConfiguration information element |
|---|

```
-- ASN1START
-- TAG-AREACONFIGURATION-START
AreaConfiguration-r16 : :=          CHOICE {
    cellGlobalIdList-r16                CellGlobalIdList-r16,
    trackingAreaCodeList-r16            TrackingAreaCodeList-r16,
    trackingAreaIdentityList-r16        TrackingAreaIdentityList-r16
}
CellGlobalIdList-r16 : :=            SEQUENCE (SIZE (1..FFS) ) OF CellGlobalIdNR
TrackingAreaCodeList-r16 : :=        SEQUENCE (SIZE (1..FFS) ) OF TrackingAreaCode
TrackingAreaIdentityList-r16 : :=    SEQUENCE (SIZE (1..FFS) ) OF TrackingAreaIdentity-r16
TrackingAreaIdentity-r16 : :=        SEQUENCE {
    plmn-Identity-r16                   PLMN-Identity,
    trackingAreaCode-r16                TrackingAreaCode
}
-- TAG-AREACONFIGURATION-STOP
-- ASN1STOP
```

As used herein, FFS indicates 'For Future Study.'

The area in which the UE is supposed to log the measurements is configured as part of the area configuration. In the existing AreaConfiguration IE in the LoggedMeasurementConfiguration the UE can be instructed to perform logging of the measurements when the UE camps in the cell which is part of the areaConfiguration. This can be seen as a limitation in scenarios when the UE camps in a neighbor cell and it can perform measurements on the cells listed in the areaConfiguration but it cannot log in the logged measurements. Especially in the case of NSA (non-standalone) deployment wherein the UEs are not allowed to camp on those cells, the network cannot get logged MDT measurements from these cells as the UEs will never camp there.

This limitation can be overcome by one of the two methods listed below.

1) Changing the definition of areaConfiguration
    In this embodiment, the UE performs the logging of measurements of the cells in the areaConfiguration whenever these cells' measurements are performed by the UE.
    1> If a cell where the UE performs measurements is part of the area indicated by AreaConfiguration if configured in VarLogMeasConfig:
2) Adding a new field subAreaConfiguration
    In this embodiment, the UE performs the logging of measurements of the cells in the subAreaConfiguration whenever these cells' measurements are performed by the UE and these cells are the neighbor cells.
    The cells to be logged can be provided in different formats in different embodiments.
        a. In one embodiment, just a frequency layer is configured in the subAreaConfiguration for which the UE is expected to log the measurements. Whenever the UE has measurements available for this frequency, the UE shall log the cells for which the measurements are performed and also the location. In some sub embodiments the UE reports only the PCI as the cell identifier and in some other embodiments, both PCI and globally unique IDs (requires reading SIB1) are logged.
        b. In another embodiment, a set of PCIs of a frequency layer is configured. In this scenario, only when the configured cells of that frequency are measured, the UE shall log these measurements. In some sub embodiments the UE reports only the PCI as the cell identifier and in some other embodiments, both PCI and globally unique IDs (requires reading SIB1) are logged.
        c. In yet another embodiment, a set of globally unique IDs of cells in a frequency layer is configured. In this scenario, only when the configured cells of that frequency are measured, the UE shall log these measurements.

As part of the logging, the UE can log the measurements associated to only those cells in the configured list, their neighbor cells, camped cells, location, any Bluetooth or WLAN Aps that the UE can hear.

According to certain embodiments, both MN and SN can configure both areaConfiguration and subAreaConfiguration.

According to certain embodiments, either MN or the SN can configure the areaConfiguration and the other leg i.e., SN or MN can configure the subAreaConfiguration.

According to certain embodiments, MN can configure both areaConfiguration and subAreaConfiguration and the SN can configure only subAreaConfiguration.

According to certain embodiments, a node can configure only one RAT specific areaConfiguration and subAreaConfiguration whereas in some other embodiments, a node can configure areaConfiguration and subAreaConfiguration belonging to different RATs.

With regard to the RAN node behavior related to areaConfiguration and subAreaConfiguration, according to some embodiments, a RAN node can perform the selection of the UE for logged MDT when the said RAN node belongs to areaConfig or sub-areaConfig or when one of the neighbor cell of the RAN node belongs to areaConfig or sub-areaConfig.

MDT Configurations after Cell Reselection

When the UE performs reselection and if the UE receives the new MDT configurations from the new cell, then UE replaces the previously configured MDT configuration with the new one. If the UE is configured with two MDT configurations, one from MN and the other from SN, then it is unclear as to whether the UE replaces the MDT configurations from MN or the MDT configurations of the SN.

Tables 3 and 4 describes certain scenarios and certain proposed solutions. Different rows represent different embodiments. Table 3 provides the intra RAT related handling and only LTE is given as an example but replacing LTE with other RAT (e.g., NR) is also applicable. Table 4 provides the inter-RAT related handling. It should be noted that the table provides different scenario when the initial MN is LTE, however when the initial MN is NR then a similar table can be by replacing LTE with NR and vice versa.

Different embodiments in the table have different flavors. Some of which is listed below.
1) In some embodiments, the node type (master or secondary) that has configured the log MDT measurements can be replaced by the similar node type.
2) In some other embodiments, at every new logged MDT configuration either from the MN or from SN, after going to idle/inactive and coming back to connected, all the existing MDT configurations are replaced.
3) In some embodiments, the RAT type (LTE or NR) will have priority over which MDT configuration shall be replaced i.e., a logged MDT configured by LTE node can be replaced by another LTE node and a logged MDT configured by NR node can be replaced by another NR node.
4) In some embodiments, a combination of the above is considered.
5) . . .

TABLE 3

| # | Initial MN MDT config | Initial SN MDT config | Type of reselection and DC post reselection | New MN MDT config | New SN MDT config | MDT config replacement action |
|---|---|---|---|---|---|---|
| 1 | From LTE | No SN MDT configuration | LTE → LTE and no DC setup | Yes | No | Replace the existing MN configured MDT configuration |
| 2 | From LTE | No SN MDT configuration | LTE → LTE and then LTE-LTE DC setup | Yes | No | Replace the existing MN configured MDT configuration with the new MDT configuration |
| 3a | From LTE | No SN MDT configuration | LTE → LTE and then LTE-LTE DC setup | No | Yes | Keep the original MN configured MDT configuration and also keep the new SN configured MDT configuration |
| 3b | From LTE | No SN MDT configuration | LTE → LTE and then LTE-LTE DC setup | No | Yes | Replace the existing MN configured MDT configuration with the new MDT configuration |
| 4a | From LTE | From LTE | LTE → LTE and no DC setup | Yes | No | Replace the existing MN configured MDT configuration with new MN configured MDT configuration and keep old SN configured MDT configuration |
| 4b | From LTE | From LTE | LTE → LTE and no DC setup | Yes | No | Discard both the existing MDT configurations and use the new MN configured MDT configuration |
| 5a | From LTE | From LTE | LTE → LTE and LTE-LTE DC setup | Yes | No | Replace the existing MN configured MDT configuration and keep SN configured MDT configuration |
| 5b | From LTE | From LTE | LTE → LTE and then LTE-LTE DC setup | Yes | No | Discard both the existing MDT configurations and use the new MN configured MDT configuration |
| 6a | From LTE | From LTE | LTE → LTE and then LTE-LTE DC setup | No | Yes | Replace the existing SN configured MDT configuration and keep old MN configured MDT configuration |
| 6b | From LTE | From LTE | LTE → LTE and then LTE-LTE DC setup | No | Yes | Discard both the existing MDT configurations and use the new SN configured MDT configuration |
| 7 | From LTE | No SN MDT configuration | LTE → LTE and then LTE-LTE DC setup | Yes | Yes | Discard existing MDT configuration and use the new MN configured and SN configured MDT configurations |

TABLE 3-continued

| # | Initial MN MDT config | Initial SN MDT config | Type of reselection and DC post reselection | New MN MDT config | New SN MDT config | MDT config replacement action |
|---|---|---|---|---|---|---|
| 8 | From LTE | From LTE | LTE→ LTE and then LTE-LTE DC setup | Yes | Yes | Discard both existing MDT configurations and use the new MN configured and SN configured MDT configurations |
| 9a | No MN configured MDT config | From LTE | LTE→ LTE and no DC setup | Yes | No | Keep the existing SN configured MDT configuration and add the new MN configured MDT config |
| 9b | No MN configured MDT config | From LTE | LTE→ LTE and no DC setup | Yes | No | Discard existing MDT configurations and use the new MN configured MDT configuration |
| 10a | No MN configured MDT config | From LTE | LTE→ LTE and then LTE-LTE DC setup | Yes | No | Discard existing MDT configuration and use the new MN configured MDT configuration |
| 10b | No MN configured MDT config | From LTE | LTE→ LTE and then LTE-LTE DC setup | Yes | No | Keep existing SN configured MDT configuration and add the new MN configured MDT configuration |
| 11 | No MN configured MDT config | From LTE | LTE→ LTE and then LTE-LTE DC setup | No | Yes | Discard existing MDT configuration and use the new SN configured MDT configuration |
| 12 | No MN configured MDT config | From LTE | LTE→ LTE and then LTE-LTE DC setup | Yes | Yes | Discard existing MDT configuration and use the new MN configured and SN configured MDT configuration |

TABLE 4

| # | Initial MN MDT config | Initial SN MDT config | Type of reselection and DC post reselection | New MN MDT config | New SN MDT config | MDT config replacement action |
|---|---|---|---|---|---|---|
| 1 | From LTE | No SN MDT configuration | LTE→ NR and no DC setup | Yes | No | Replace the existing MN configured MDT configuration |
| 2a | From LTE | No SN MDT configuration | LTE→ NR and then NE-DC setup | Yes | No | Replace the existing MN configured MDT configuration with the new MDT configuration |
| 2b | From LTE | No SN MDT configuration | LTE→ NR and then NE-DC setup | Yes | No | Keep the original MN configured MDT configuration and add the new MN configured MDT configuration |
| 3a | From LTE | No SN MDT configuration | LTE→ NR and then NE-DC setup | No | Yes | Replace the existing MN configured MDT configuration with the new SN configured MDT configuration |
| 3b | From LTE | No SN MDT configuration | LTE→ NR and then NE-DC setup | No | Yes | Keep the existing MN configured MDT configuration and add on the new SN configured MDT configuration |

TABLE 4-continued

| # | Initial MN MDT config | Initial SN MDT config | Type of reselection and DC post reselection | New MN MDT config | New SN MDT config | MDT config replacement action |
|---|---|---|---|---|---|---|
| 4 | From LTE | No SN MDT configuration | LTE→ NR and then NE-DC setup | Yes | Yes | Discard the original MN configured MDT configuration and use the newly received MN configured and SN configured MDT configurations |
| 5a | From LTE | From LTE | LTE → NR and no DC setup | Yes | No | Replace the existing MN configured MDT configuration and keep the SN configured MDT configuration |
| 5b | From LTE | From LTE | LTE → NR and no DC setup | Yes | No | Discard existing MDT configurations and use the new MN configured MDT configuration |
| 6a | From LTE | From LTE | LTE→ NR and then NE-DC setup | Yes | No | Replace the existing MN configured MDT configuration with the new MDT configuration and keep the SN configured MDT configuration |
| 6b | From LTE | From LTE | LTE→ NR and then NE-DC setup | Yes | No | Discard existing MDT configurations and use the new MN configured MDT configuration |
| 7a | From LTE | From LTE | LTE→ NR and then NE-DC setup | No | Yes | Discard both MDT configurations and keep the new SN configured MDT configuration |
| 7b | From LTE | From LTE | LTE→ NR and then NE-DC setup | No | Yes | Keep the existing MN configured MDT configuration and replace the SN configured MDT configuration |
| 8 | From LTE | From LTE | LTE→ NR and then NE-DC setup | Yes | Yes | Discard the original MDT configurations and use the newly received MN configured and SN configured MDT configurations |
| 9a | From LTE | From NR | LTE → NR and no DC setup | Yes | No | Replace the existing MN configured MDT configuration with new MN configured MDT configuration and keep the SN configured MDT configuration |
| 9b | From LTE | From NR | LTE → NR and no DC setup | Yes | No | Discard existing MDT configurations and use the new MN configured MDT configuration |
| 9c | From LTE | From NR | LTE → NR and no DC setup | Yes | No | Keep the existing MN configured MDT configuration and replace the existing SN configured MDT configuration with the new MN configured MDT configuration |
| 10a | From LTE | From NR | LTE→ NR and then NE-DC setup | Yes | No | Replace the existing MN configured MDT configuration with the new MDT configuration and |

TABLE 4-continued

| # | Initial MN MDT config | Initial SN MDT config | Type of reselection and DC post reselection | New MN MDT config | New SN MDT config | MDT config replacement action |
|---|---|---|---|---|---|---|
| 10b | From LTE | From NR | LTE→ NR and then NE-DC setup | Yes | No | keep the existing SN configured MDT configuration Discard existing MDT configurations and use the new MN configured MDT configuration. |
| 10c | From LTE | From NR | LTE→ NR and then NE-DC setup | Yes | No | Keep the existing MN configured MDT configuration and replace the existing SN configured MDT configuration with the new MN configured MDT configuration. |
| 11a | From LTE | From NR | LTE→ NR and then NE-DC setup | No | Yes | Replace the existing MN configured MDT configuration with the new SN configured MDT configuration and keep the old SN configured MDT configuration |
| 11b | From LTE | From NR | LTE→ NR and then NE-DC setup | No | Yes | Discard all existing MDT configurations and use the new SN configured MDT configuration |
| 11c | From LTE | From NR | LTE→ NR and then NE-DC setup | No | Yes | Keep the original MN configured MDT configuration and replace the old SN configured MDT config with the new SN configured MDT config. |
| 12 | From LTE | From NR | LTE→ NR and then NE-DC setup | Yes | Yes | Discard both the original MDT configurations and use the newly received MN configured and SN configured MDT configurations |
| 13a | From LTE | From NR | LTE→ NR and then NR-DC setup | Yes | No | Replace the existing MN configured MDT configuration with the new MDT configuration and keep the existing SN configured MDT configuration |
| 13b | From LTE | From NR | LTE→ NR and then NR-DC setup | Yes | No | Discard existing MDT configurations and use the new MN configured MDT configuration. |
| 13c | From LTE | From NR | LTE→ NR and then NR-DC setup | Yes | No | Keep the existing MN configured MDT configuration and replace the existing SN configured MDT configuration with the new MN configured MDT configuration. |
| 14a | From LTE | From NR | LTE→ NR and then NR-DC setup | No | Yes | Discard all existing MDT configurations and use the new SN configured MDT configuration |
| 14b | From LTE | From NR | LTE→ NR and then NR-DC setup | No | Yes | Keep the original MN configured MDT configuration and replace the old SN |

TABLE 4-continued

| # | Initial MN MDT config | Initial SN MDT config | Type of reselection and DC post reselection | New MN MDT config | New SN MDT config | MDT config replacement action |
|---|---|---|---|---|---|---|
| 15 | From LTE | From NR | LTE→ NR and then NR-DC setup | Yes | Yes | configured MDT config with the new SN configured MDT config. Discard both the original MDT configurations and use the newly received MN configured and SN configured MDT configurations |
| 16 | From LTE | No SN MDT configuration | LTE → LTE and EN-DC setup | Yes | No | Replace the existing MN configured MDT configuration with the new MN configured MDT configuration |
| 17a | From LTE | No SN MDT configuration | LTE → LTE and EN-DC setup | No | Yes | Discard all existing MDT configurations and use the new SN configured MDT configuration |
| 17b | From LTE | No SN MDT configuration | LTE → LTE and EN-DC setup | No | Yes | Keep the original MN configured MDT configuration and add the new SN configured MDT configuration |
| 18 | From LTE | No SN MDT configuration | LTE → LTE and EN-DC setup | Yes | Yes | Discard all existing MDT configurations and use the new MN configured and the new SN configured MDT configurations |
| 19a | From LTE | From LTE | LTE → LTE and EN-DC setup | Yes | No | Replace the existing MN configured MDT configuration with the new MN configured MDT configuration and keep the SN configured MDT configuration |
| 19b | From LTE | From LTE | LTE → LTE and EN-DC setup | Yes | No | Discard all existing MDT configurations and use the new MN configured MDT configuration |
| 20a | From LTE | From LTE | LTE → LTE and EN-DC setup | No | Yes | Discard all existing MDT configurations and use the new SN configured MDT configuration |
| 20b | From LTE | From LTE | LTE → LTE and EN-DC setup | No | Yes | Keep the original MN configured MDT configuration and replace the existing SN configured MDT config with the new SN configured MDT configuration |
| 21 | From LTE | From LTE | LTE → LTE and EN-DC setup | Yes | Yes | Discard all existing MDT configurations and use the new MN configured and the new SN configured MDT configurations |
| 22a | From LTE | From NR | LTE → LTE and EN-DC setup | Yes | No | Replace the existing MN configured MDT configuration with the new MN configured MDT configuration and keep the SN configured MDT configuration |

TABLE 4-continued

| # | Initial MN MDT config | Initial SN MDT config | Type of reselection and DC post reselection | New MN MDT config | New SN MDT config | MDT config replacement action |
|---|---|---|---|---|---|---|
| 22b | From LTE | From NR | LTE → LTE and EN-DC setup | Yes | No | Discard all existing MDT configurations and use the new MN configured MDT configuration |
| 23a | From LTE | From NR | LTE → LTE and EN-DC setup | No | Yes | Discard all existing MDT configurations and use the new SN configured MDT configuration |
| 23b | From LTE | From NR | LTE → LTE and EN-DC setup | No | Yes | Keep the original MN configured MDT configuration and replace the existing SN configured MDT config with the new SN configured MDT configuration |
| 24 | From LTE | From NR | LTE → LTE and EN-DC setup | Yes | Yes | Discard all existing MDT configurations and use the new MN configured and the new SN configured MDT configurations |
| 25a | From LTE | No SN MDT configuration | LTE→NR and NR-DC setup | Yes | No | Replace the existing MN configured MDT configuration with the new MN configured MDT configuration |
| 25b | From LTE | No SN MDT configuration | LTE→NR and NR-DC setup | Yes | No | Keep the original MN configured MDT configuration and add the new MN configured MDT configuration |
| 26a | From LTE | No SN MDT configuration | LTE→NR and NR-DC setup | No | Yes | Discard all existing MDT configuration and use the new SN configured MDT configuration |
| 26b | From LTE | No SN MDT configuration | LTE→NR and NR-DC setup | No | Yes | Keep the original MN configured MDT configuration and add the new SN configured MDT configuration |
| 27 | From LTE | No SN MDT configuration | LTE→NR and NR-DC setup | Yes | Yes | Discard all existing MDT configuration and use the new MN configured and new SN configured MDT configuration |
| 28a | From LTE | From NR | LTE → LTE and no DC setup | Yes | No | Replace the existing MN MDT configuration with the new MN configured MDT configuration and keep the existing SN configured MDT configuration |
| 28b | From LTE | From NR | LTE → LTE and no DC setup | Yes | No | Discard all existing MDT configuration and use the new MN configured MDT configuration |
| 29a | From LTE | From LTE | LTE → NR and NR DC setup | Yes | No | Replace the existing MN MDT configuration with the new MN configured MDT configuration and keep the existing SN configured MDT configuration |

TABLE 4-continued

| # | Initial MN MDT config | Initial SN MDT config | Type of reselection and DC post reselection | New MN MDT config | New SN MDT config | MDT config replacement action |
|---|---|---|---|---|---|---|
| 29b | From LTE | From LTE | LTE → NR and NR DC setup | Yes | No | Discard all existing MDT configuration and use the new MN configured MDT configuration |
| 30a | From LTE | From LTE | LTE → NR and NR DC setup | No | Yes | Replace the existing SN MDT configuration with the new SN configured MDT configuration and keep the existing MN configured MDT configuration |
| 30b | From LTE | From LTE | LTE → NR and NR DC setup | No | Yes | Discard all existing MDT configuration and use the new MN configured MDT configuration |
| 31 | From LTE | From LTE | LTE → NR and NR DC setup | Yes | Yes | Discard all existing MDT configuration and use the new MN configured and the new SN configured MDT configurations |
| 32a | No MN MDT config | From NR | LTE → LTE and no DC | Yes | No | Discard all existing MDT configuration and use the new MN configured MDT configuration |
| 32b | No MN MDT config | From NR | LTE → LTE and no DC | Yes | No | Keep the original SN configured MDT config and add the new MN configured MDT config |
| 33a | No MN MDT config | From NR | LTE → LTE and EN-DC setup | Yes | No | Discard all existing MDT configuration and use the new MN configured MDT configuration |
| 33b | No MN MDT config | From NR | LTE → LTE and EN-DC setup | Yes | No | Keep the original SN configured MDT config and add the new MN configured MDT config |
| 34 | No MN MDT config | From NR | LTE → LTE and EN-DC setup | No | Yes | Discard all existing MDT configuration and use the new SN configured MDT configuration |
| 35 | No MN MDT config | From NR | LTE → LTE and EN-DC setup | Yes | Yes | Discard all existing MDT configuration and use the new MN configured and new SN configured MDT configurations |
| 36a | No MN MDT config | From NR | LTE → NR and no DC setup | Yes | No | Discard all existing MDT configuration and use the new MN configured MDT configuration |
| 36b | No MN MDT config | From NR | LTE → NR and no DC setup | Yes | No | Keep the old SN configured MDT config and add the new MN configured MDT configuration |
| 37a | No MN MDT config | From NR | LTE→ NR and NR DC setup | Yes | No | Discard all existing MDT configuration and use the new MN configured MDT configuration |
| 37b | No MN MDT config | From NR | LTE→ NR and NR DC setup | Yes | No | Keep the existing SN configured MDT config and add the new MN configured MDT configuration |

TABLE 4-continued

| # | Initial MN MDT config | Initial SN MDT config | Type of reselection and DC post reselection | New MN MDT config | New SN MDT config | MDT config replacement action |
|---|---|---|---|---|---|---|
| 38 | No MN MDT config | From NR | LTE→ NR and NR DC setup | No | Yes | Discard all existing MDT configuration and use the new SN configured MDT configuration |
| 39 | No MN MDT config | From NR | LTE→ NR and NR DC setup | Yes | Yes | Discard all existing MDT configuration and use the new MN configured and new SN configured MDT configurations |
| 40a | No MN MDT config | From NR | LTE→ NR and NE DC setup | Yes | No | Keep the original SN configured MDT config and add the new MN configured MDTR config |
| 40b | No MN MDT config | From NR | LTE→ NR and NE DC setup | Yes | No | Discard all existing MDT configuration and use the new MN configured MDT configuration |
| 41a | No MN MDT config | From NR | LTE→ NR and NE DC setup | No | Yes | Discard all existing MDT configuration and use the new SN configured MDT configuration |
| 41b | No MN MDT config | From NR | LTE→ NR and NE DC setup | No | Yes | Keep the original SN configured MDT config and add the new SN configured MDT config |
| 42 | No MN MDT config | From NR | LTE→ NR and NE DC setup | Yes | Yes | Discard all existing MDT configuration and use the new MN configured and new SN configured MDT configurations |
| 43a | No MN MDT config | From LTE | LTE → LTE and EN-DC setup | Yes | No | Discard all existing MDT configuration and use the new MN configured MDT configuration |
| 43b | No MN MDT config | From LTE | LTE → LTE and EN-DC setup | Yes | No | Keep the original SN configured MDT config and add the new MN configured MDT config |
| 44a | No MN MDT config | From LTE | LTE → LTE and EN-DC setup | No | Yes | Discard all existing MDT configuration and use the new SN configured MDT configuration |
| 44b | No MN MDT config | From LTE | LTE → LTE and EN-DC setup | No | Yes | Keep the original SN configured MDT config and add the new SN configured MDT config |
| 45 | No MN MDT config | From LTE | LTE → LTE and EN-DC setup | Yes | Yes | Discard all existing MDT configuration and use the new MN configured and new SN configured MDT configurations |
| 46a | No MN MDT config | From LTE | LTE → NR and no DC setup | Yes | No | Discard all existing MDT configuration and use the new MN configured MDT configuration |
| 46b | No MN MDT config | From LTE | LTE → NR and no DC setup | Yes | No | Keep the old SN configured MDT config and add the new MN configured MDT configuration |

TABLE 4-continued

| # | Initial MN MDT config | Initial SN MDT config | Type of reselection and DC post reselection | New MN MDT config | New SN MDT config | MDT config replacement action |
|---|---|---|---|---|---|---|
| 47a | No MN MDT config | From LTE | LTE→ NR and NR DC setup | Yes | No | Discard all existing MDT configuration and use the new MN configured MDT configuration |
| 47b | No MN MDT config | From LTE | LTE→ NR and NR DC setup | Yes | No | Keep the existing SN configured MDT config and add the new MN configured MDT configuration |
| 48a | No MN MDT config | From LTE | LTE→ NR and NR DC setup | No | Yes | Discard all existing MDT configuration and use the new SN configured MDT configuration |
| 48b | No MN MDT config | From LTE | LTE→ NR and NR DC setup | No | Yes | Keep the existing SN configured MDT config and add the new SN configured MDT configuration |
| 49 | No MN MDT config | From LTE | LTE→ NR and NR DC setup | Yes | Yes | Discard all existing MDT configuration and use the new MN configured and new SN configured MDT configurations |
| 50a | No MN MDT config | From LTE | LTE→ NR and NE DC setup | Yes | No | Keep the original SN configured MDT config and add the new MN configured MDTR config |
| 50b | No MN MDT config | From LTE | LTE→ NR and NE DC setup | Yes | No | Discard all existing MDT configuration and use the new MN configured MDT configuration |
| 51a | No MN MDT config | From LTE | LTE→ NR and NE DC setup | No | Yes | Discard all existing MDT configuration and use the new SN configured MDT configuration |
| 51b | No MN MDT config | From LTE | LTE→ NR and NE DC setup | No | Yes | Keep the original SN configured MDT config and add the new SN configured MDT config |
| 52 | No MN MDT config | From LTE | LTE→ NR and NE DC setup | Yes | Yes | Discard all existing MDT configuration and use the new MN configured and new SN configured MDT configurations |

Figure 5:
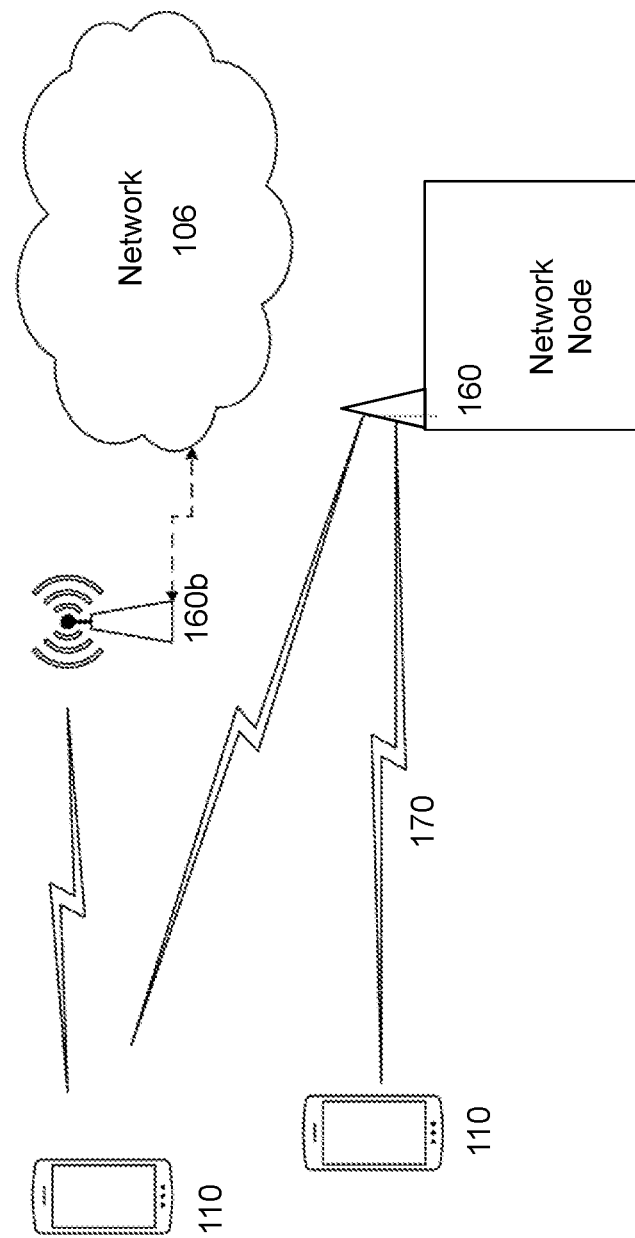
FIG. 5 illustrates an example wireless network, according to certain embodiments.

FIG. 5 illustrates a wireless network, in accordance with some embodiments. Although the subject matter described herein may be implemented in any appropriate type of system using any suitable components, the embodiments disclosed herein are described in relation to a wireless network, such as the example wireless network illustrated in FIG. 5. For simplicity, the wireless network of FIG. 5 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 6:
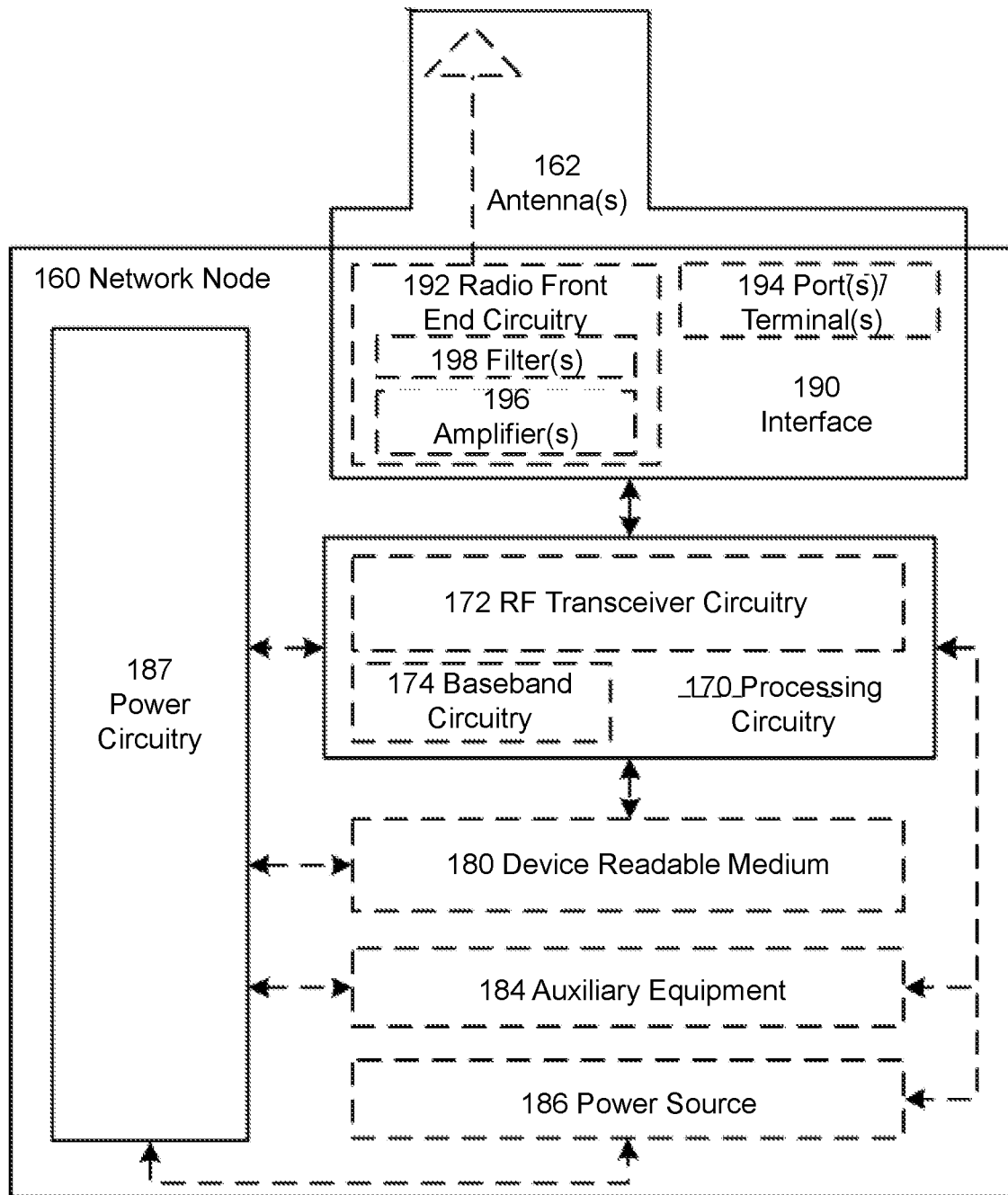
FIG. 6 illustrates an example network node, according to certain embodiments.

FIG. 6 illustrates an example network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 160 includes processing circuitry 170, device readable medium 180, interface 190, auxiliary equipment 184, power source 186, power circuitry 187, and antenna 162. Although network node 160 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, Global System for Mobile Communication (GSM), Wide Code Division Multiplexing Access (WCDMA), Long Term Evolution (LTE), New Radio (NR), WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHZ. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187.

The battery may provide backup power should the external power source fail. Other types of power sources, such as photovoltaic devices, may also be used.

Alternative embodiments of network node 160 may include additional components beyond those shown in FIG. 6 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

Figure 7:
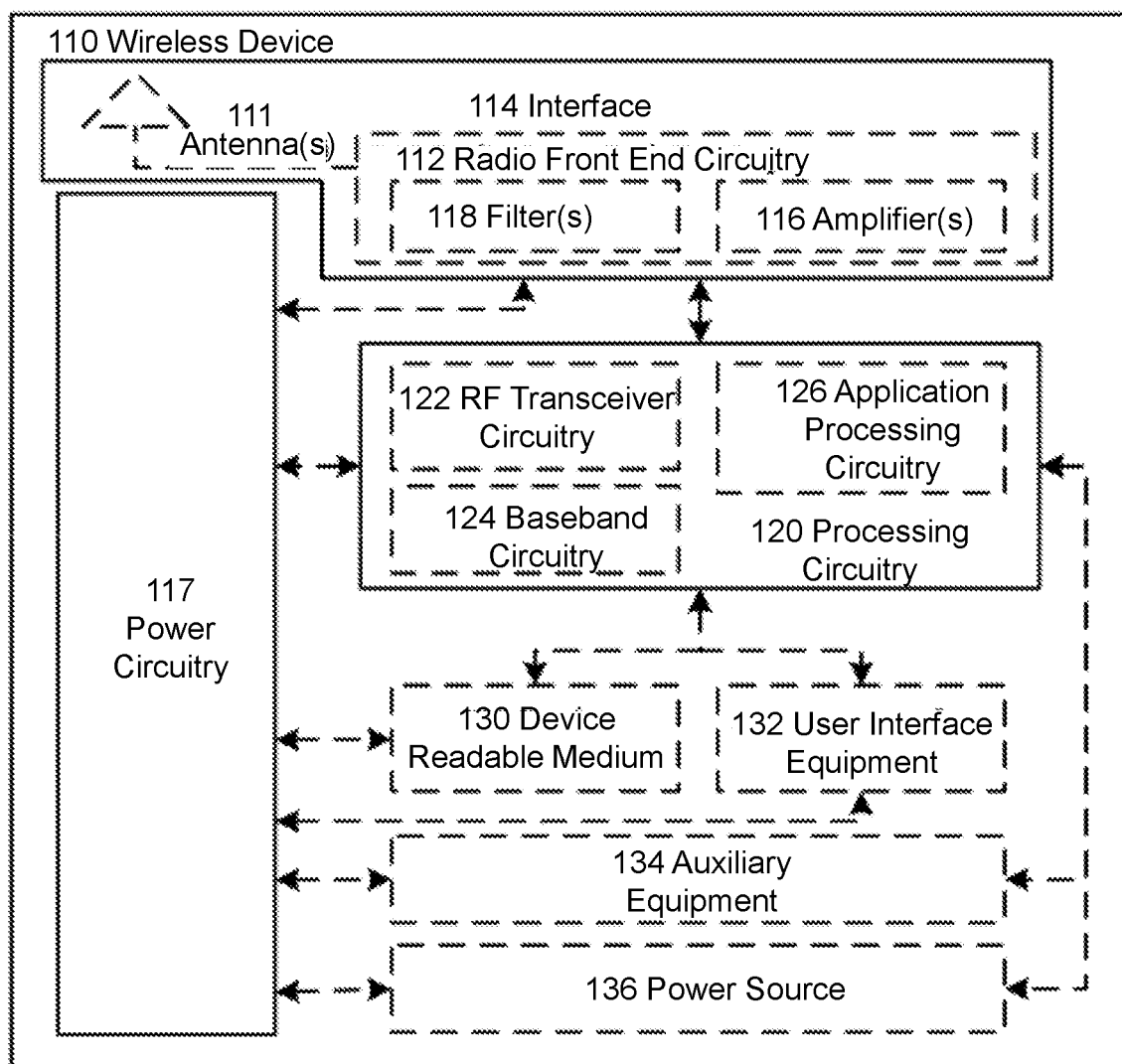
FIG. 7 illustrates an example wireless device, according to certain embodiments.

FIG. 7 illustrates an example wireless device 110, according to certain embodiments. As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 8:
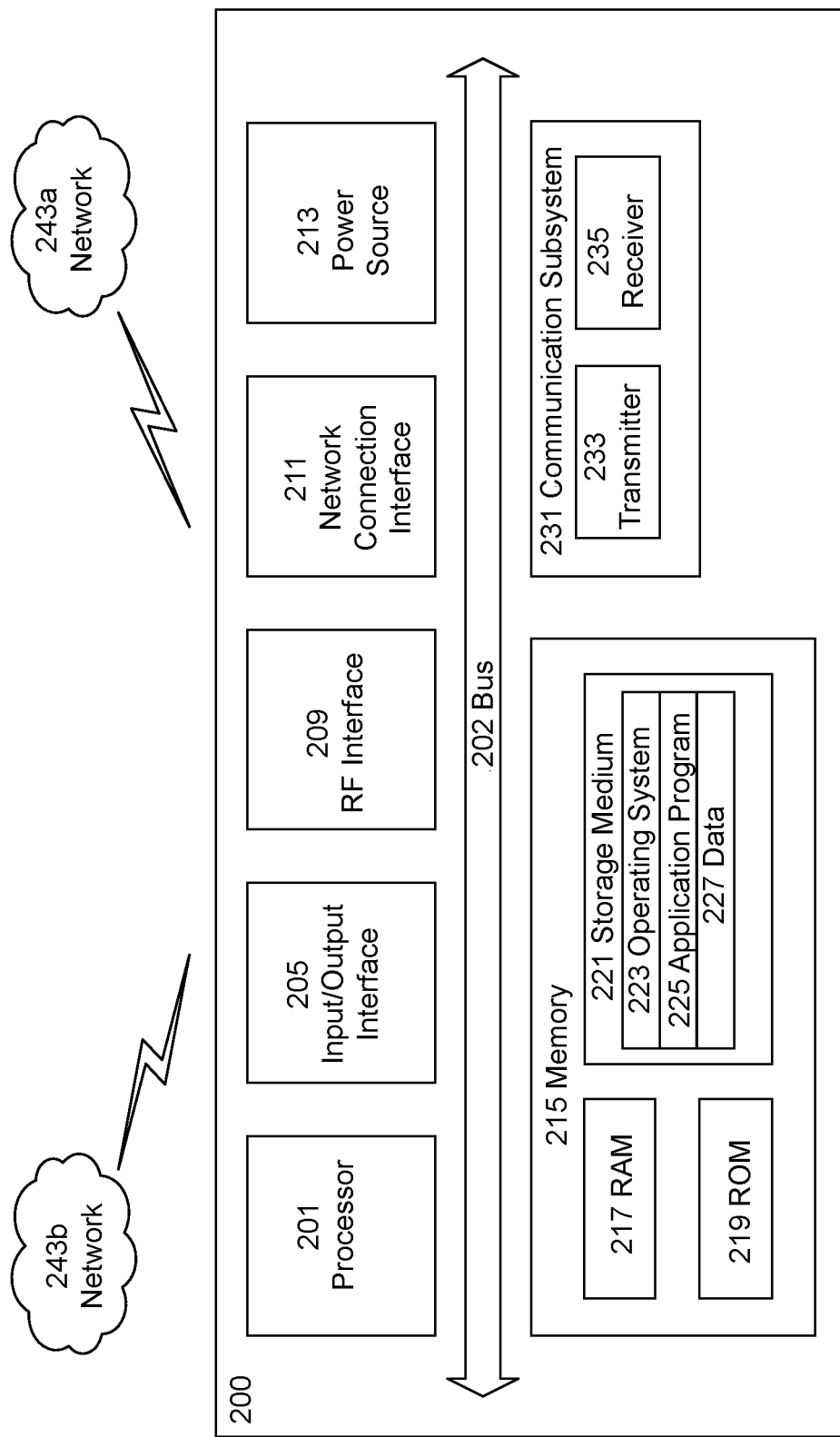
FIG. 8 illustrate an example user equipment, according to certain embodiments.

FIG. 8 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3rd Generation Partnership Project (3GPP), including a NB-IoT UE, a machine type communication (MTC) UE, and/or an enhanced MTC (eMTC) UE. UE 200, as illustrated in FIG. 6, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 8 is a UE, the components discussed herein are equally applicable to a WD, and vice-versa.

In FIG. 8, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface 209 may be configured to provide a communication interface to RF components such as a transmitter, a receiver, and an antenna. Network connection interface 211 may be configured to provide a communication interface to network 243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 8, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 9:
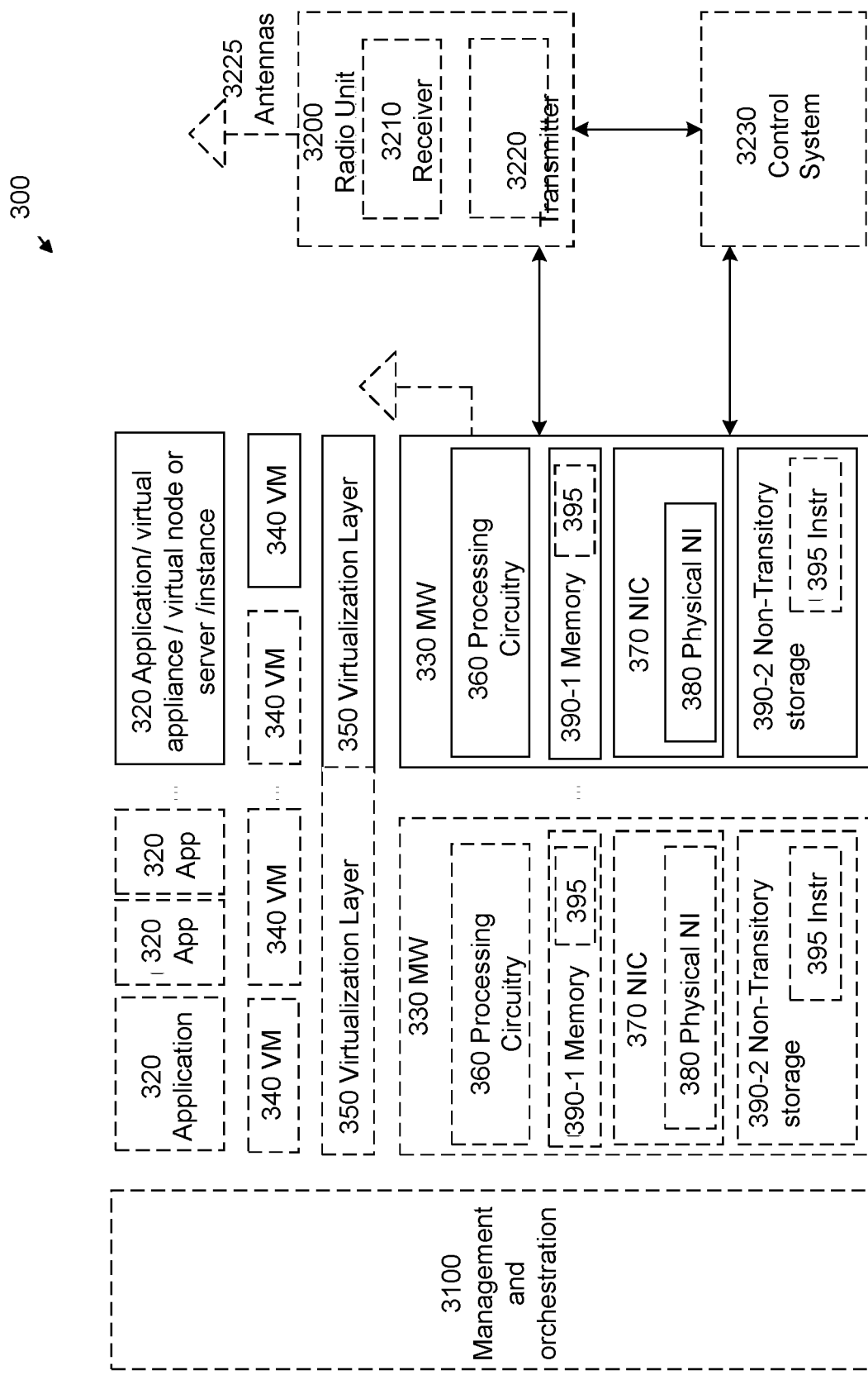
FIG. 9 illustrates a virtualization environment in which functions implemented by some embodiments may be virtualized, according to certain embodiments.

FIG. 9 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 9, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 9.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be affected with the use of control system 3230 which may alternatively be used for communication between the hardware nodes 330 and radio units 3200.

Figure 10:
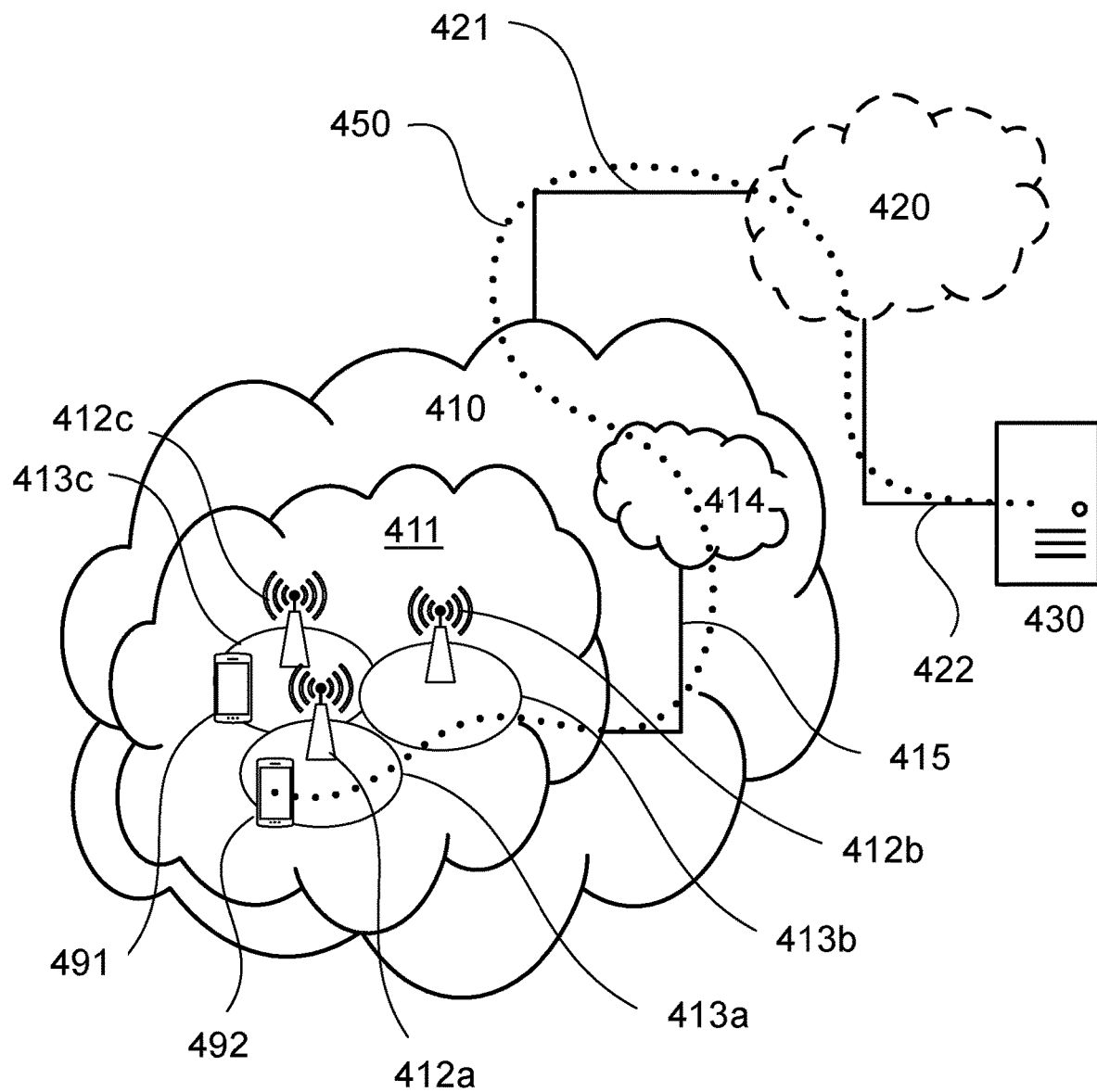
FIG. 10 illustrates a telecommunication network connected via an intermediate network to a host computer, according to certain embodiments.

FIG. 10 illustrates a telecommunication network connected via an intermediate network to a host computer in accordance with some embodiments.

With reference to FIG. 10, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 10 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 11:
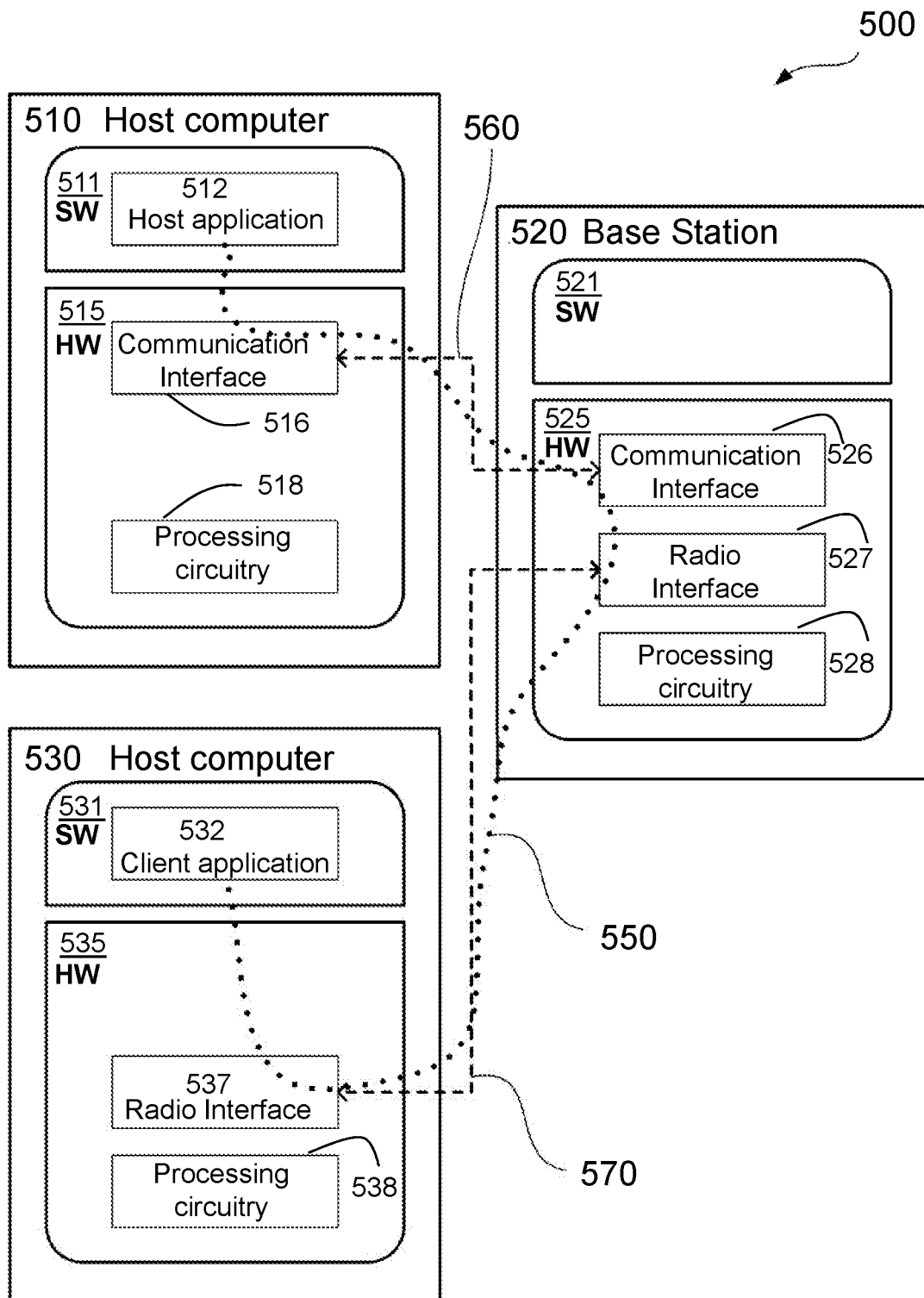
FIG. 11 illustrates a generalized block diagram of a host computer communicating via a base station with a user equipment over a partially wireless connection, according to certain embodiments.

FIG. 11 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 11. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 11) served by base station 520. Communication interface 526 may be configured to facilitate connection 560 to host computer 510. Connection 560 may be direct or it may pass through a core network (not shown in FIG. 11) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 11 may be similar or identical to host computer 430, one of base stations 412a, 412b, 412c and one of UEs 491, 492 of FIG. 10, respectively. This is to say, the inner workings of these entities may be as shown in FIG. 11 and independently, the surrounding network topology may be that of FIG. 10.

In FIG. 11, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the data rate, latency, and/or power consumption and thereby provide benefits such as reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figures 12, 13:
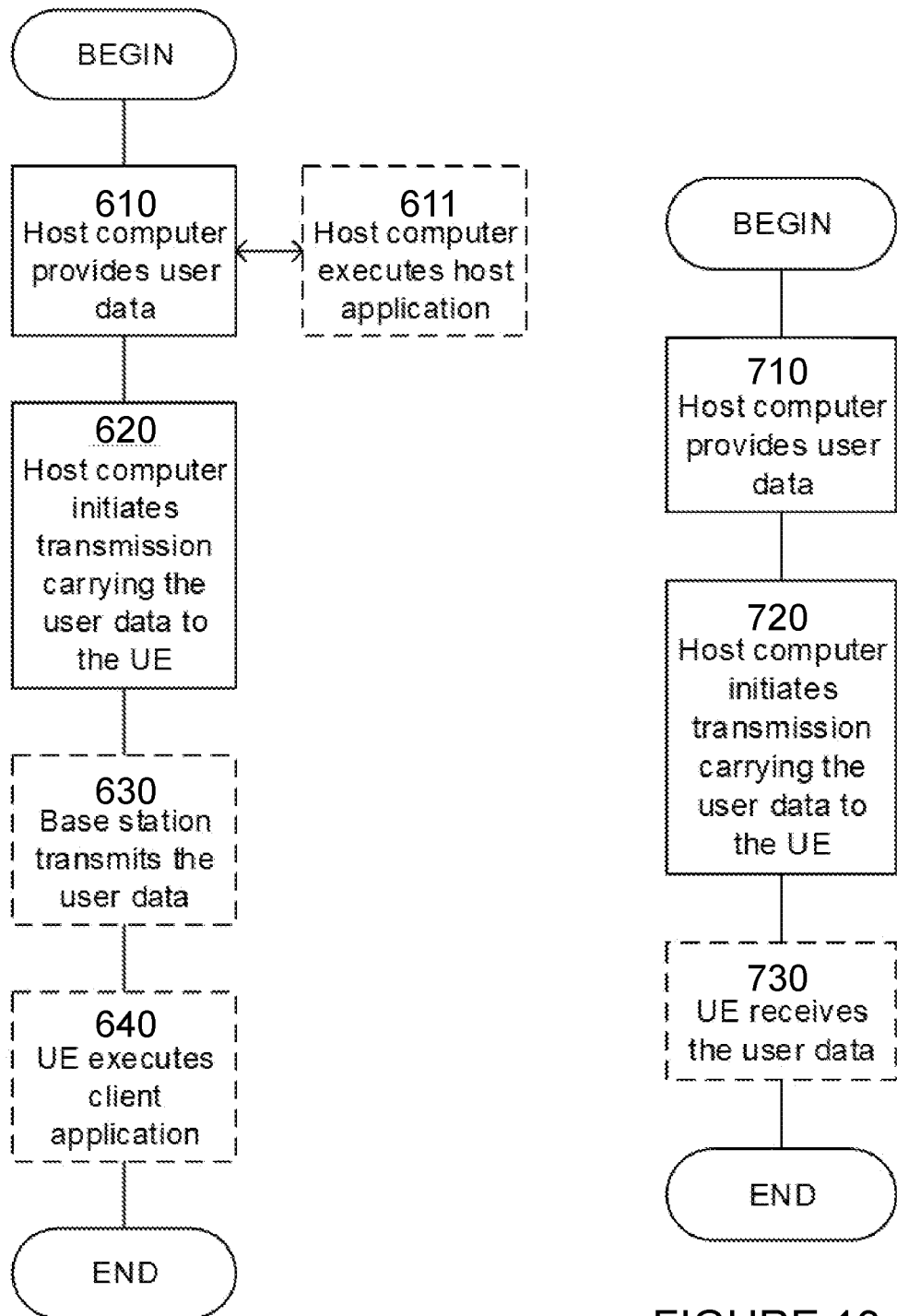
FIG. 12 illustrates a method implemented in a communication system, according to one embodiment.
FIG. 13 illustrates another method implemented in a communication system, according to one embodiment.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figures 14, 15:
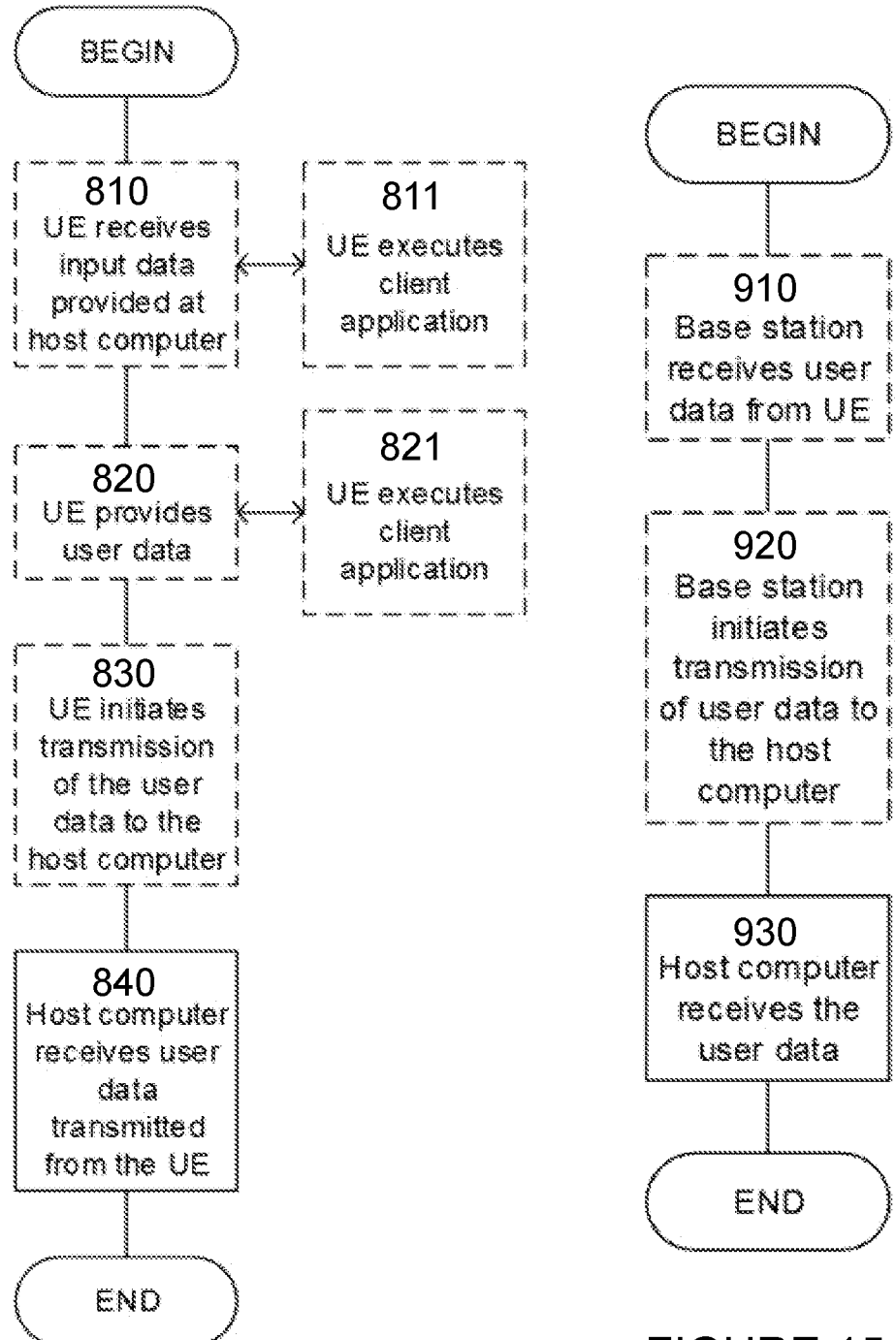
FIG. 14 illustrates another method implemented in a communication system, according to one embodiment.
FIG. 15 illustrates another method implemented in a communication system, according to one embodiment.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 810 (which may be optional), the UE receives input data provided by the host computer.

Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Figure 16:
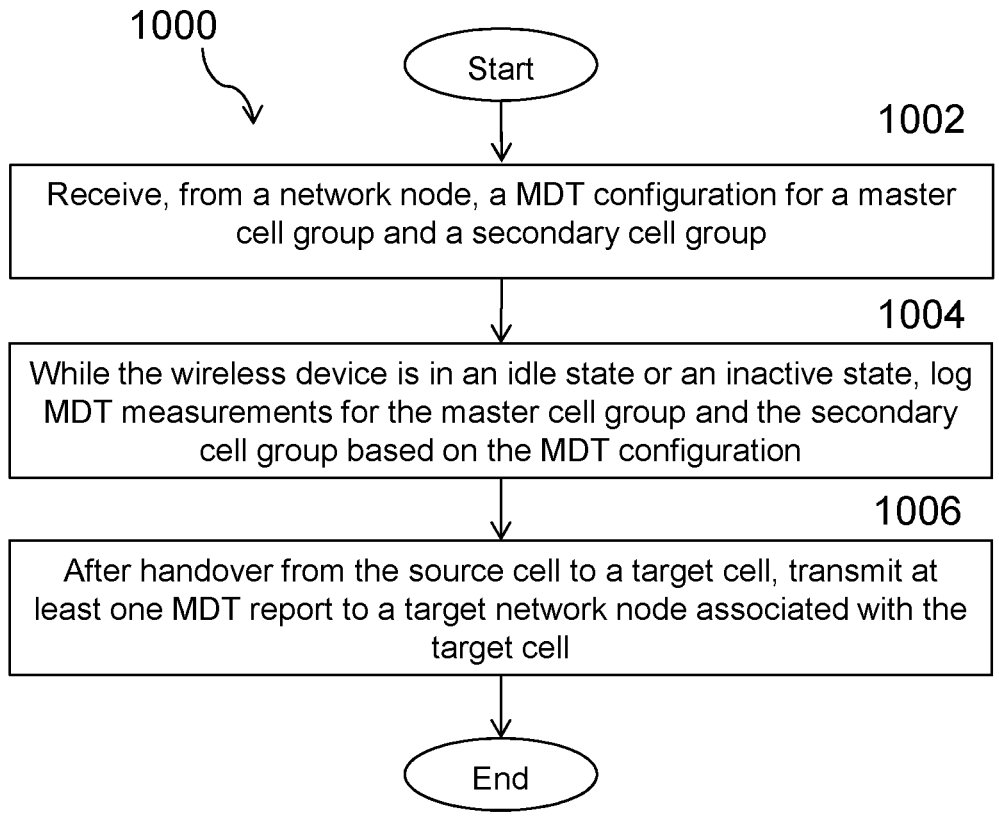
FIG. 16 illustrates an example method by a wireless device, according to certain embodiments.

FIG. 16 depicts a method 1000 by a wireless device 110, according to certain embodiments. At step 1002, the wireless device 110 receives, from a network node 160, a MDT configuration for a MCG and a SCG. At step 1004, while the wireless device 110 is in an idle state or an inactive state, the wireless device 110 logs MDT measurements for the MCG and the SCG based on the MDT configuration. At step 1006, after handover from the source cell to a target cell, the wireless device 110 transmits at least one MDT report to a target network node associated with the target cell.

In a particular embodiment, the network node 160 comprises a source network node associated with the source cell.

In a particular embodiment, transmitting the at least one MDT report comprises transmitting a single report comprising MDT measurements for the MCG and the SCG. In a further particular embodiment, receiving the MDT configuration for the MCG and the SCG comprises receiving an index identifying a first trace collection entity for the MCG and the SCG.

In a particular embodiment, transmitting the at least one MDT report comprises transmitting a first report comprising the MDT measurements for the MCG and transmitting a second report comprising the MDT measurements for the SCG. In a further particular embodiment, receiving the MDT configuration for the MCG and the SCG comprises receiving a first index identifying a first TCE for the MCG and receiving a second index identifying a second TCE for the SCG.

In a particular embodiment, the method further includes receiving a change to the MDT configuration for the SCG. In a further particular embodiment, the change to the MDT configuration for the SCG is received while the wireless device 110 is performing MDT measurements for the SCG, and the method further comprises deleting the MDT measurements for the SCG, wherein the at least one MDT report does not include the MDT measurements for the SCG. In a further particular embodiment, the wireless device 110 is in the inactive state or the idle state when the MDT configuration is received, and wherein the SCG is not supported by the target cell, and the method further comprises at least one of:

discarding the MDT measurements for the SCG;
transmitting the MDT measurements for the SCG to a master network node for forwarding to a secondary node associated with the SCG;
transmitting the MDT measurements for the SCG to the master network node for forwarding to a TCE associated with the SCG In a particular embodiment, the MDT configuration comprises a MDT reconfiguration.

In a particular embodiment, the MDT configuration comprises at least one of a management-based MDT configuration and a signaling-based MDT configuration.

In a particular embodiment, the wireless device 110 operates in DC with a master network node associated with a master cell and a secondary network node associated with a secondary cell, and wherein the DC is one of: EN-DC, NE-DC, NG-EN-DC, NR NR DC, and E-UTRA-E-UTRA DC.

In a particular embodiment, the wireless device 110 operates in carrier aggregation, and wherein the SCG provides carrier aggregation.

In a particular embodiment, receiving the MDT configuration comprises an area configuration indicating an area in which the wireless device 110 is to log performed MDT measurements. In a further particular embodiment, the wireless device 110 is camped onto a cell within the area configuration when the wireless device 110 logs the MDT measurements for the MCG and the SCG. In a further particular embodiment, the SCG is not within the area configuration but is a neighboring cell to the area indicated in the area configuration. In a further particular embodiment, the area configuration comprises a plurality of sub areas for which the wireless device is to log performed MDT measurements. In a further particular embodiment, each sub area comprises a frequency layer for which the wireless device 110 is to log performed MDT measurements. In a further particular embodiment, each sub area comprises a set of PCIs for which the wireless device 110 is to log performed MDT measurements. In a further particular embodiment, each sub area comprises a set of globally unique IDs of cells in a frequency layer for which the wireless device is to log performed MDT measurements.

Figure 17:
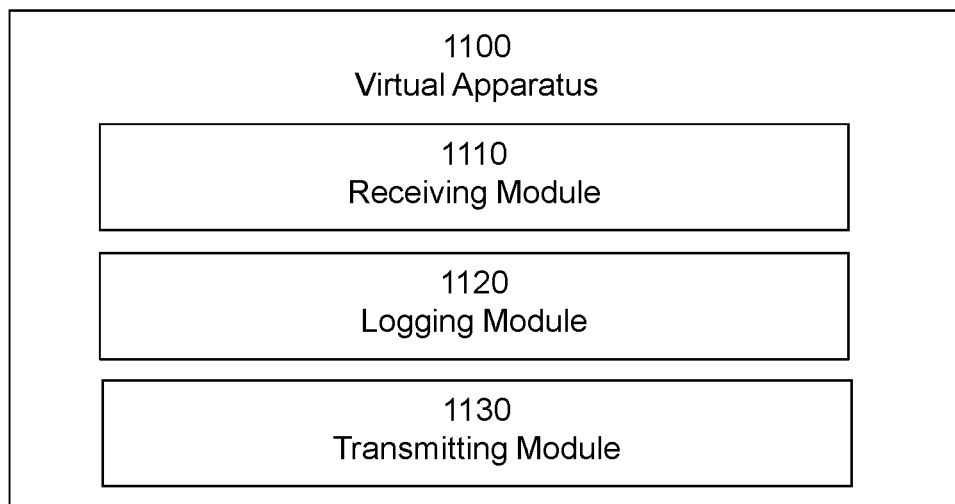
FIG. 17 illustrates an exemplary virtual computing device, according to certain embodiments.

In a particular embodiment, the source cell and the target cell are operating using a same radio access technology, and wherein the method further comprises after handover from the source cell to the target cell, receiving a new MDT configuration from the target cell FIG. 17 illustrates a schematic block diagram of a virtual apparatus 1100 in a wireless network (for example, the wireless network shown in FIG. 5). The apparatus may be implemented in a wireless device or network node (e.g., wireless device 110 or network node 160 shown in FIG. 5). Apparatus 1100 is operable to carry out the example method described with reference to FIG. 16 and possibly any other processes or methods disclosed herein. It is also to be understood that the method of FIG. 16 is not necessarily carried out solely by apparatus 1100. At least some operations of the method can be performed by one or more other entities.

Virtual Apparatus 1100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving module 1110, logging module 1120, transmitting module 1130, and any other suitable units of apparatus 1100 to perform corresponding functions according one or more embodiments of the present disclosure.

According to certain embodiments, receiving module 1110 may perform certain of the receiving functions of the apparatus 1100. For example, receiving module 1110 may receive from a network node, a MDT configuration for a master cell group and a secondary cell group.

According to certain embodiments, logging module 1120 may perform certain of the logging functions of the apparatus 1100. For example, while the wireless device is in an idle state or an inactive state, logging module 1120 may log MDT measurements for the master cell group and the secondary cell group based on the MDT configuration.

According to certain embodiments, transmitting module 1130 may perform certain of the transmitting functions of the apparatus 1100. For example, after handover from the source cell to a target cell, transmitting module 1130 may transmit at least one MDT report to a target network node associated with the target cell.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 18:
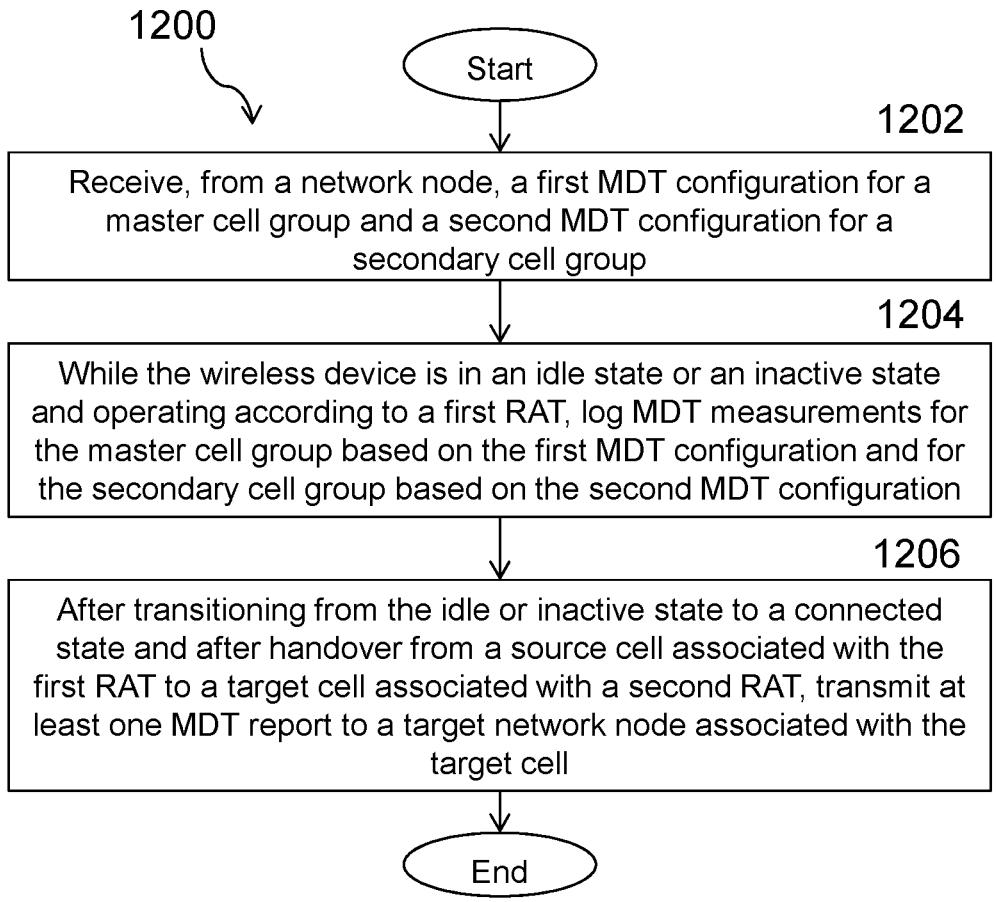
FIG. 18 illustrates another example method by a wireless device, according to certain embodiments.

FIG. 18 depicts a method 1200 by a wireless device 110, according to certain embodiments. At step 1202, the wireless device 110 receives from a network node 160, a MDT configuration for a MCG and a SCG. While the wireless device 110 is in an idle state or an inactive state and operating according to a first RAT, the wireless device 110 logs MDT measurements for the MCG and the SCG based on the MDT configuration, at step 1204. After transitioning from the idle or inactive state to a connected state and after handover from a source cell associated with the first RAT to a target cell associated with a second RAT, the wireless device 110 transmits at least one MDT report to a target network node associated with the target cell, at step 1206.

In a particular embodiment, when transmitting the at least one MDT report, the wireless device 110 transmits a single report comprising MDT measurements for the MCG and MDT measurements for the SCG.

In a particular embodiment, when receiving the MDT configuration for the MCG and the SCG, the wireless device 110 receives at least one index identifying a first TCE for the MCG and the SCG.

In a particular embodiment, when transmitting the at least one MDT report, the wireless device 110 transmits a first report comprising the MDT measurements for the MCG and a second report comprising the MDT measurements for the SCG.

In a particular embodiment, receiving the MDT configuration for the MCG and the SCG includes receiving a first index identifying a first TCE for the MCG and a second index identifying a second TCE for the SCG.

In a particular embodiment, the wireless device 110 receives a change to the MDT configuration for the SCG while the wireless device 110 is performing MDT measurements for the SCG associated with the first RAT. In response to receiving the change to the MDT configuration for the SCG, wireless device 110 deletes the MDT measurements for the SCG, and the at least one MDT report transmitted to the target network node does not include the MDT measurements for the SCG.

In a particular embodiment, the wireless device 110 is in the inactive state or the idle state when a change to the MDT configuration is received, and the SCG is not supported by the target cell. Wireless device 110 may then perform at least one of: discarding the MDT measurements for the SCG; transmitting the MDT measurements for the SCG to a master network node for forwarding to a secondary node associated with the SCG; and transmitting the MDT measurements for the SCG to the master network node for forwarding to a TCE associated with the SCG.

In a particular embodiment, the wireless device operates in DC with a master network node associated with a master cell and a secondary network node associated with a secondary cell, and wherein the DC is one of: Evolved-Universal Terrestrial Radio Access-New Radio-Dual Connectivity, EN-DC; New Radio-Evolved-Universal Terrestrial Radio Access-Dual Connectivity, NE-DC; Next Generation-Evolved-Universal Terrestrial Radio Access-New Radio-Dual Connectivity, NG-EN-DC; New Radio-New Radio Dual Connectivity, NR NR DC; and Evolved-Universal Terrestrial Radio Access-Evolved-Universal Terrestrial Radio Access Dual Connectivity, E-UTRA-E-UTRA DC.

In a particular embodiment, the MDT configuration comprises an area configuration indicating an area in which the wireless device 110 is to log performed MDT measurements. In a further particular embodiment, the wireless device 110 is camped onto a cell within the area configuration when the wireless device 110 logs the MDT measurements for the MCG and the MDT measurements for the SCG. In a further particular embodiment, the SCG is not within the area configuration but is a neighboring cell to the area indicated in the area configuration.

In a particular embodiment, the area configuration comprises a plurality of sub areas for which the wireless device 110 is to log performed MDT measurements, and wherein each sub area comprises at least one of: a frequency layer for which the wireless device is to log performed MDT measurements; a set of physical cell identifiers, PCIs, for which the wireless device is to log performed MDT measurements; or a set of globally unique identifiers of cells in a frequency layer for which the wireless device is to log performed MDT measurements.

In a particular embodiment, the first RAT and the second RAT are a same RAT, and after handover from the source cell to the target cell, the wireless device 110 receives a new MDT configuration from the target cell. The new MDT configuration includes at least one of a new MDT configuration for a new master cell and a new MDT configuration for a new secondary cell.

Figure 19:
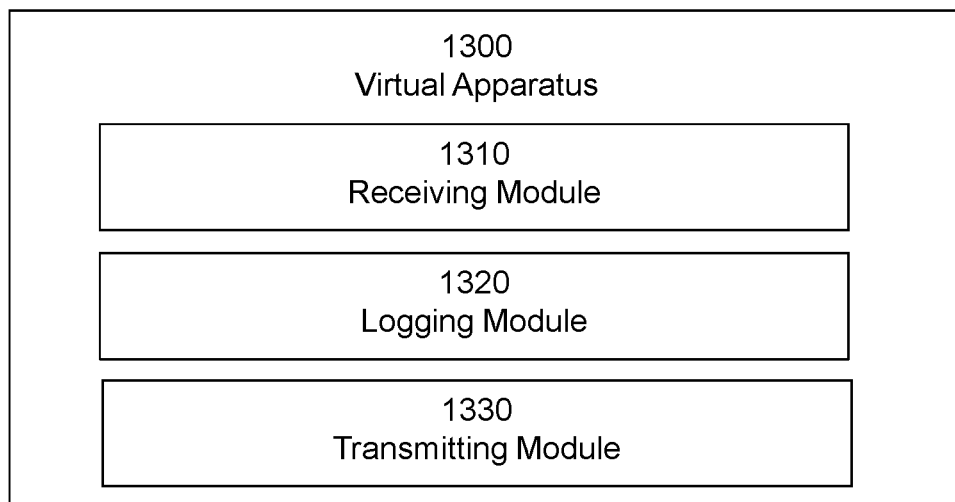
FIG. 19 illustrates another exemplary virtual computing device, according to certain embodiments.

FIG. 19 illustrates a schematic block diagram of a virtual apparatus 1300 in a wireless network (for example, the wireless network shown in FIG. 5). The apparatus may be implemented in a wireless device or network node (e.g., wireless device 110 or network node 160 shown in FIG. 5). Apparatus 1300 is operable to carry out the example method described with reference to FIG. 18 and possibly any other processes or methods disclosed herein. It is also to be understood that the method of FIG. 18 is not necessarily carried out solely by apparatus 1300. At least some operations of the method can be performed by one or more other entities.

Virtual Apparatus 1300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving module 1110, logging module 1120, transmitting module 1130, and any other suitable units of apparatus 1100 to perform corresponding functions according one or more embodiments of the present disclosure.

According to certain embodiments, receiving module 1110 may perform certain of the receiving functions of the apparatus 1100. For example, receiving module 1110 may receive from a network node 160, a MDT configuration for a MCG and a SCG.

According to certain embodiments, logging module 1120 may perform certain of the logging functions of the apparatus 1100. For example, while the wireless device is in an idle state or an inactive state, logging module 1120 may log MDT measurements for the MCG and the SCG based on the MDT configuration.

According to certain embodiments, transmitting module 1130 may perform certain of the transmitting functions of the apparatus 1100. For example, after transitioning from the idle or inactive state to a connected state and after handover from a source cell associated with the first RAT to a target cell associated with a second RAT, transmitting module 1130 may transmit at least one MDT report to a target network node associated with the target cell.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 20:
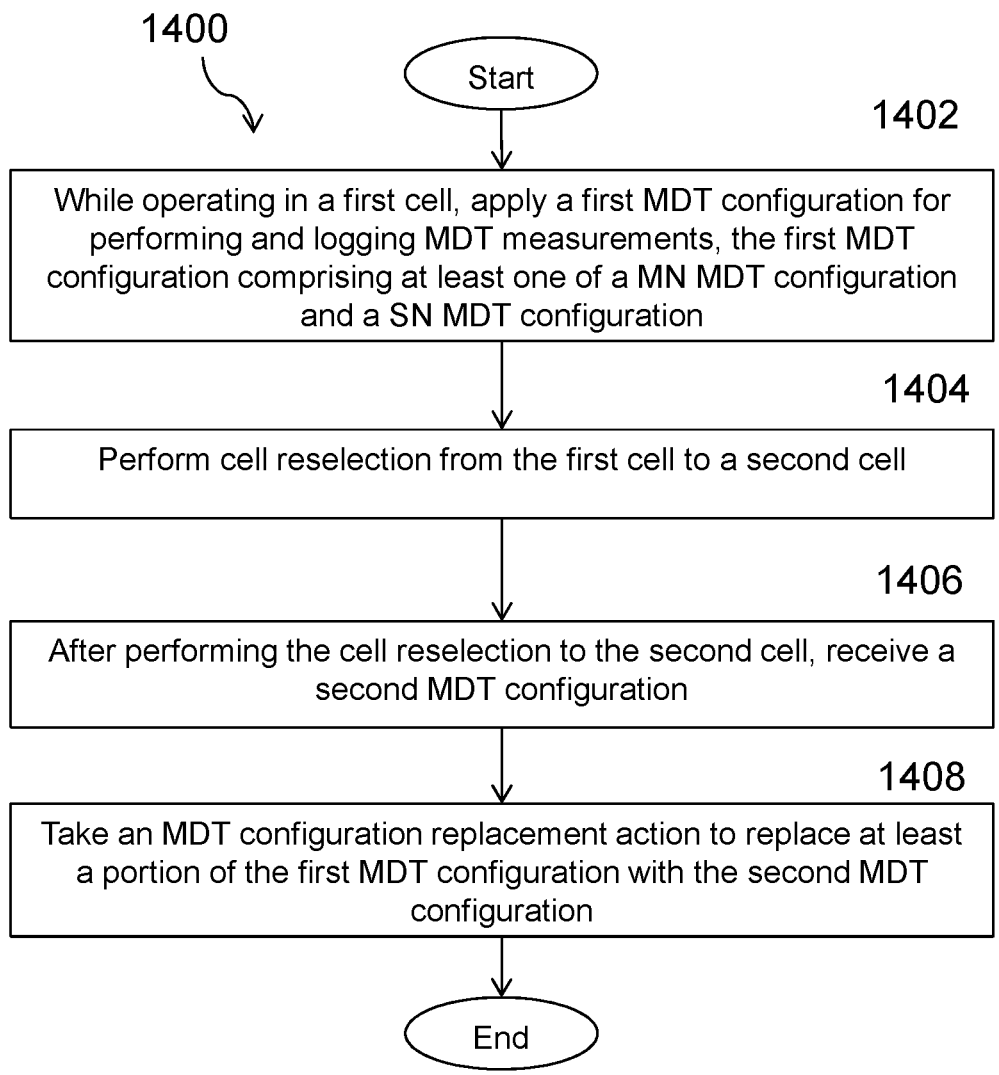
FIG. 20 illustrates another example method by a wireless device, according to certain embodiments.

FIG. 20 depicts a method 1400 by a wireless device 110, according to certain embodiments. At step 1402, while operating in a first cell, the wireless device applies a first MDT configuration for performing and logging MDT measurements, the first MDT configuration comprising at least one of a master node (MN) MDT configuration and a secondary node (SN) MDT configuration. At step 1404, the wireless device performs cell reselection from the first cell to a second cell. After performing the cell reselection to the second cell, the wireless device receives a second MDT configuration, at step 1406. At step 1408, the wireless device takes an MDT configuration replacement action to replace at least a portion of the first MDT configuration with the second MDT configuration.

In a particular embodiment, one of scenarios 1-12 from Table 3 above may be true. Specifically, the first MDT configuration may include an initial MN MDT configuration and an initial SN MDT configuration, as summarized in Table 3. The second MDT configuration may include a new MN MDT configuration and a new SN MDT configuration, as summarized in Table 3.

In a particular embodiment, one of scenarios 1-52 from Table 4 above may be true. Specifically, the first MDT configuration may include an initial MN MDT configuration and an initial SN MDT configuration, as summarized in Table 4. The second MDT configuration may include a new MN MDT configuration and a new SN MDT configuration, as summarized in Table 4.

Figure 21:
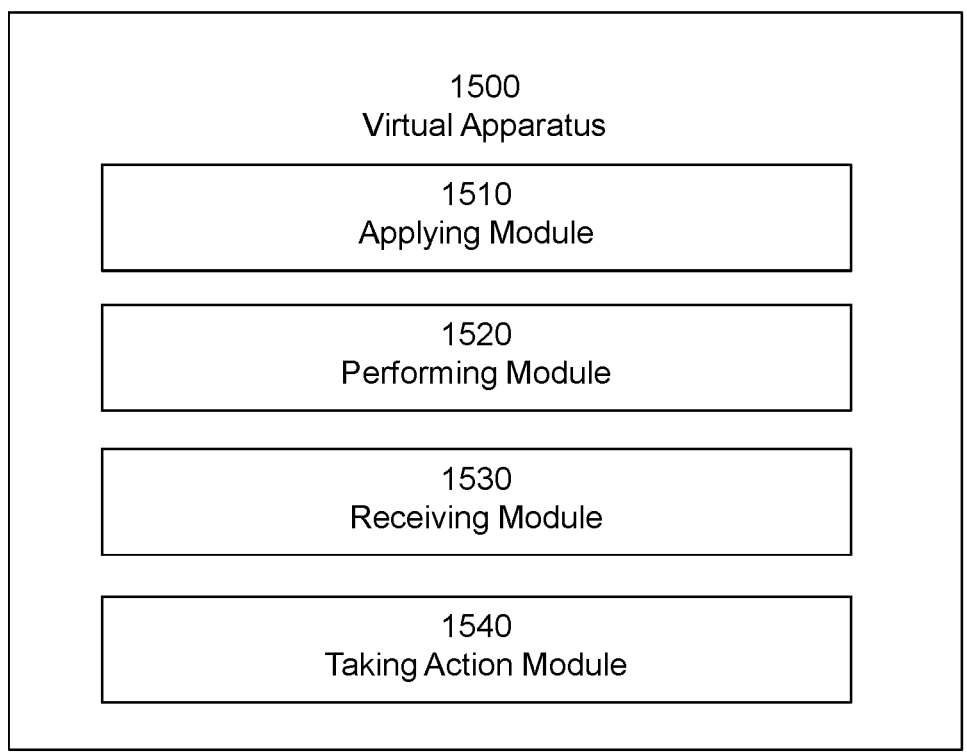
FIG. 21 illustrates another exemplary virtual computing device, according to certain embodiments.

FIG. 21 illustrates a schematic block diagram of a virtual apparatus 1500 in a wireless network (for example, the wireless network shown in FIG. 5). The apparatus may be implemented in a wireless device or network node (e.g., wireless device 110 or network node 160 shown in FIG. 5). Apparatus 1500 is operable to carry out the example method described with reference to FIG. 20 and possibly any other processes or methods disclosed herein. It is also to be understood that the method of FIG. 20 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause applying module 1510, performing module 1520, receiving module 1530, taking action module 1540, and any other suitable units of apparatus 1500 to perform corresponding functions according one or more embodiments of the present disclosure.

According to certain embodiments, applying module 1510 may perform certain of the applying functions of the apparatus 1500. For example, while operating in a first cell, applying module 1510 may apply a first MDT configuration for performing and logging MDT measurements, the first MDT configuration comprising at least one of a master node (MN) MDT configuration and a secondary node (SN) MDT configuration.

According to certain embodiments, performing module 1520 may perform certain of the performing functions of the apparatus 1500. For example, performing module 1520 may perform cell reselection from the first cell to a second cell.

According to certain embodiments, receiving module 1530 may perform certain of the receiving functions of the apparatus 1500. For example, after the cell reselection to the second cell is performed, receiving module 1530 may receive a second MDT configuration.

According to certain embodiments, taking action module 1540 may perform certain of the taking action functions of the apparatus 1500. For example, taking action module 1540 may take an MDT configuration replacement action to replace at least a portion of the first MDT configuration with the second MDT configuration.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 22:
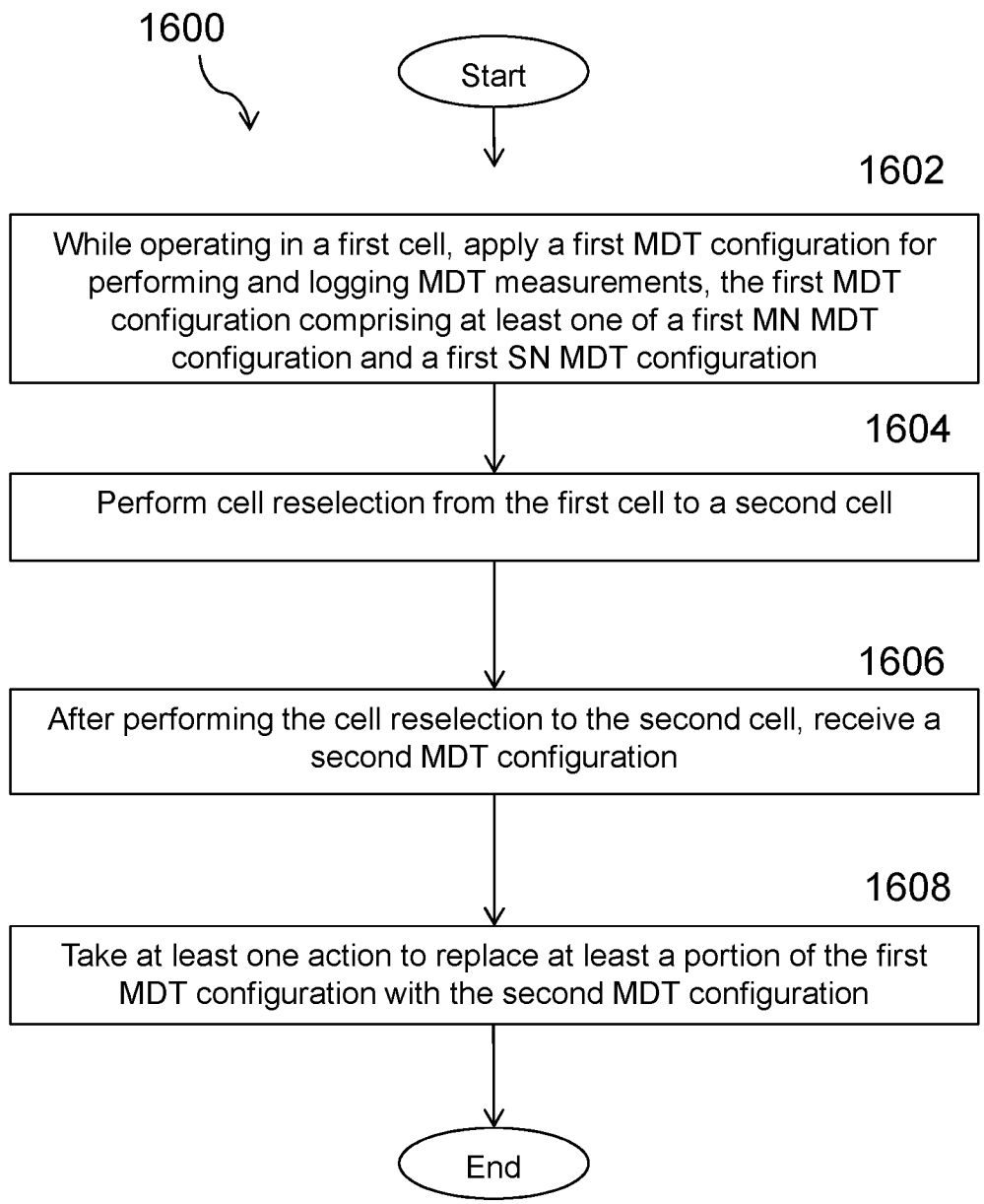
FIG. 22 illustrates another example method by a wireless device, according to certain embodiments.

FIG. 22 depicts a method 1600 by a wireless device 110, according to certain embodiments. At step 1602, while operating in a first cell, the wireless device 110 applies a first MDT configuration for performing and logging MDT measurements. The first MDT configuration includes at least one of a first MN MDT configuration and a first SN MDT configuration. At step 1604, the wireless device 110 performs cell reselection from the first cell to a second cell. After performing the cell reselection to the second cell, the wireless device 110 receives a second MDT configuration, at step 1606. At step 1608, the wireless device 110 takes at least one action to replace at least a portion of the first MDT configuration with the second MDT configuration.

In a particular embodiment, the second MDT configuration includes a second MN MDT configuration and a second SN MDT configuration. In a further particular embodiment, when taking the at least one action, the wireless device 110 replaces the first MN MDT configuration received in the first MDT configuration with the second MN MDT configuration received in the second MDT configuration. Alternatively, the wireless device 110 replaces the first SN MDT configuration received in the first MDT configuration with the second SN MDT configuration received in the second MDT configuration.

In a particular embodiment, when taking the at least one action, the wireless device 110 replaces a RAT specific MDT configuration received in the first MDT configuration with a same RAT specific MDT configuration received in the second MDT configuration.

Figure 23:
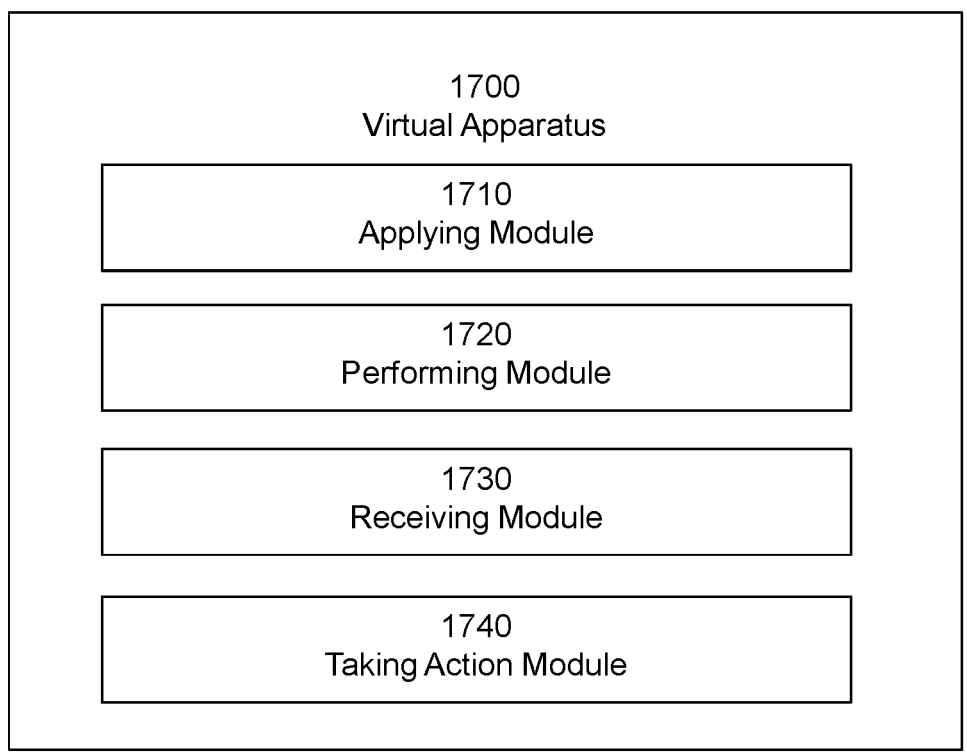
FIG. 23 illustrates another exemplary virtual computing device, according to certain embodiments.

FIG. 23 illustrates a schematic block diagram of a virtual apparatus 1700 in a wireless network (for example, the wireless network shown in FIG. 5). The apparatus may be implemented in a wireless device or network node (e.g., wireless device 110 or network node 160 shown in FIG. 5). Apparatus 1700 is operable to carry out the example method described with reference to FIG. 22 and possibly any other processes or methods disclosed herein. It is also to be understood that the method of FIG. 22 is not necessarily carried out solely by apparatus 1700. At least some operations of the method can be performed by one or more other entities.

Virtual Apparatus 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause applying module 1710, performing module 1720, receiving module 1730, taking action module 1740, and any other suitable units of apparatus 1700 to perform corresponding functions according one or more embodiments of the present disclosure.

According to certain embodiments, applying module 1710 may perform certain of the applying functions of the apparatus 1700. For example, while operating in a first cell, applying module 1710 may apply a first MDT configuration for performing and logging MDT measurements. The first MDT configuration includes at least one of a first MN MDT configuration and a first SN MDT configuration.

According to certain embodiments, performing module 1720 may perform certain of the performing functions of the apparatus 1700. For example, performing module 1720 may perform cell reselection from the first cell to a second cell.

According to certain embodiments, receiving module 1730 may perform certain of the receiving functions of the apparatus 1700. For example, after the cell reselection to the second cell is performed, receiving module 1730 may receive a second MDT configuration.

According to certain embodiments, taking action module 1740 may perform certain of the taking action functions of the apparatus 1700. For example, taking action module 1740 may take at least one action to replace at least a portion of the first MDT configuration with the second MDT configuration.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 24:
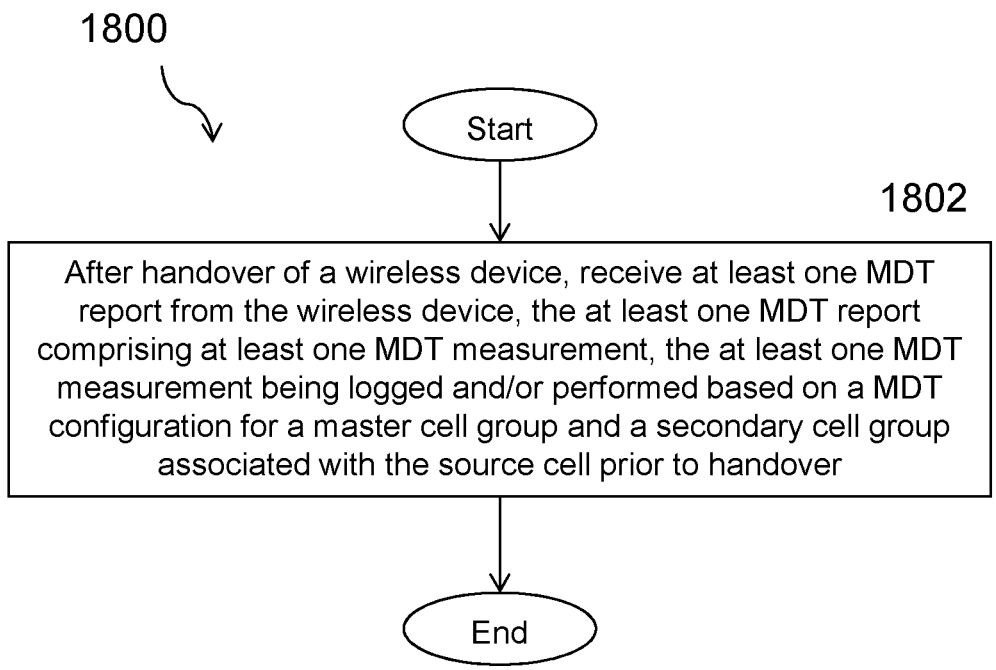
FIG. 24 illustrates an example method by a network node operating as a target network node after a handover of a wireless device from a source cell to a target cell, according to certain embodiments.

FIG. 24 depicts a method 1800 by a network node 160 operating as a target network node after a handover of a wireless device from a source cell to a target cell associated with the target network node, according to certain embodiments. At step 1802, and after the handover of the wireless device, the network node receives at least one MDT report from the wireless device. The at least one MDT report comprises at least one MDT measurement, and the at least one MDT measurement is logged and/or performed based on a MDT configuration for a master cell group and a secondary cell group associated with the source cell prior to handover.

In a particular embodiment, receiving the at least one MDT report comprises receiving a single report comprising MDT measurements for the master cell group and the secondary cell group.

In a particular embodiment, receiving the at least one MDT report comprises receiving a first report comprising the MDT measurements for the master cell group and receiving a second report comprising the MDT measurements for the secondary cell group.

In a particular embodiment, the MDT configuration comprises a MDT reconfiguration. In a particular embodiment, the MDT configuration comprises at least one of a management-based MDT configuration and a signaling-based MDT configuration.

In a particular embodiment, the wireless device operates in dual connectivity, and wherein the dual connectivity is one of: EN-DC, NE-DC, NG-EN-DC, NR NR DC, and E-UTRA-E-UTRA DC.

In a particular embodiment, the wireless device operates in carrier aggregation, and wherein the secondary cell group provides carrier aggregation.

In a particular embodiment, the MDT configuration comprises an area configuration indicating an area in which the wireless device is to log performed MDT measurements.

In a particular embodiment, the wireless device is camped onto a cell within the area configuration when the wireless device logs the MDT measurements for the master cell group and the secondary cell group.

In a particular embodiment, the secondary cell group is not within the area configuration but is a neighboring cell to the area indicated in the area configuration.

In a particular embodiment, the area configuration comprises a plurality of sub areas for which the wireless device is to log performed MDT measurements. In a further particular embodiment, each sub area comprises a frequency layer for which the wireless device is to log performed MDT measurements. In a further particular embodiment, each sub area comprises a set of PCIs for which the wireless device is to log performed MDT measurements. In a further particular embodiment, each sub area comprises a set of globally unique IDs of cells in a frequency layer for which the wireless device is to log performed MDT measurements.

In a particular embodiment, the source cell and the target cell are operating using a same radio access technology.

In a particular embodiment, the source cell and the target cell are operating using different radio access technologies.

Figure 25:
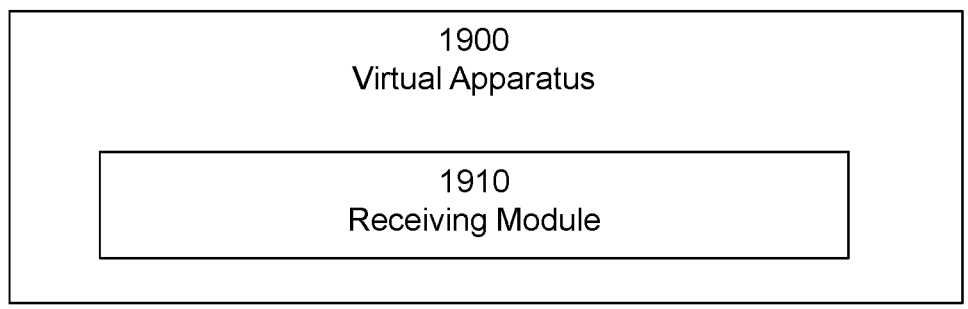
FIG. 25 illustrates another exemplary virtual computing device, according to certain embodiments.

FIG. 25 illustrates a schematic block diagram of a virtual apparatus 1900 in a wireless network (for example, the wireless network shown in FIG. 5). The apparatus may be implemented in a wireless device or network node (e.g., wireless device 110 or network node 160 shown in FIG. 5). Apparatus 1900 is operable to carry out the example method described with reference to FIG. 24 and possibly any other processes or methods disclosed herein. It is also to be understood that the method of FIG. 24 is not necessarily carried out solely by apparatus 1900. At least some operations of the method can be performed by one or more other entities.

Virtual Apparatus 1900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving module 1910 and any other suitable units of apparatus 1900 to perform corresponding functions according one or more embodiments of the present disclosure.

According to certain embodiments, receiving module 1910 may perform certain of the receiving functions of the apparatus 1900. For example, after handover of a wireless device from a source cell to a target cell associated with a target network node, receiving module 1910 may receive at least one MDT report from the wireless device. The at least one MDT report comprises at least one MDT measurement, and the at least one MDT measurement is logged and/or performed based on a MDT configuration for a master cell group and a secondary cell group associated with the source cell prior to handover.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 26:
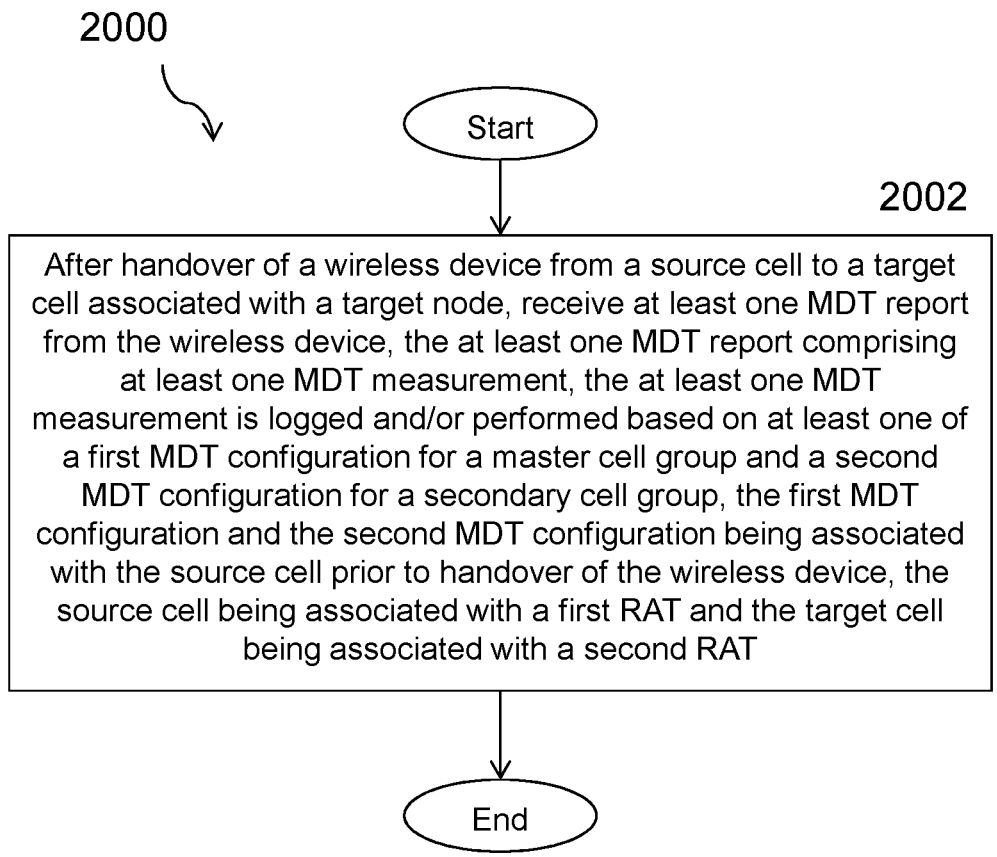
FIG. 26 illustrates another example method by a network node operating as a target network node after a handover of a wireless device from a source cell to a target cell, according to certain embodiments.

FIG. 26 depicts a method 2000 by a network node 160 operating as a target network node after a handover of a wireless device 110 from a source cell to a target cell associated with the target network node, according to certain embodiments. At step 2002, and after the handover of the wireless device 110, the network node 160 receives at least one MDT report from the wireless device 110. The at least one MDT report includes at least one MDT measurement logged and/or performed based on a MDT configuration for a MCG and a SCG. The MDT configuration is associated with the source cell prior to handover of the wireless device.

In a particular embodiment, when receiving the at least one MDT report, the network node 160 receives a single report comprising MDT measurements for the MCG and MDT measurements for the SCG.

In a particular embodiment, when receiving the at least one MDT report, the network node 160 receives a first report comprising the MDT measurements for the MCG and a second report comprising the MDT measurements for the SCG.

In a particular embodiment, the wireless device 110 operates in one of: EN-DC, NE-DC, NG-EN-DC, NR NR DC, and E-UTRA-E-UTRA.

In a particular embodiment, the MDT configuration comprises an area configuration indicating an area in which the wireless device is to log performed MDT measurements.

In a particular embodiment, the wireless device is camped onto a cell within the area configuration when the wireless device logs the MDT measurements for the MCG and the MDT measurements for the SCG.

In a particular embodiment, the SCG is not within the area configuration but is a neighboring cell to the area indicated in the area configuration.

In a particular embodiment, the area configuration comprises a plurality of sub areas for which the wireless device is to log performed MDT measurements, and wherein each sub area comprises:
  a frequency layer for which the wireless device is to log performed MDT measurements;
  a set of physical cell identifiers, PCIs, for which the wireless device is to log performed MDT measurements; or
  a set of globally unique identifiers of cells in a frequency layer for which the wireless device is to log performed MDT measurements.

In a particular embodiment, the first RAT and the second RAT are a same RAT.

In a particular embodiment, the first RAT and the second RAT are different RATs, and the network node 160 transmits a new MDT configuration to the wireless device 110. The new MDT configuration includes at least one of a new MDT configuration for a new master cell and a new MDT configuration for a new secondary cell.

Figure 27:
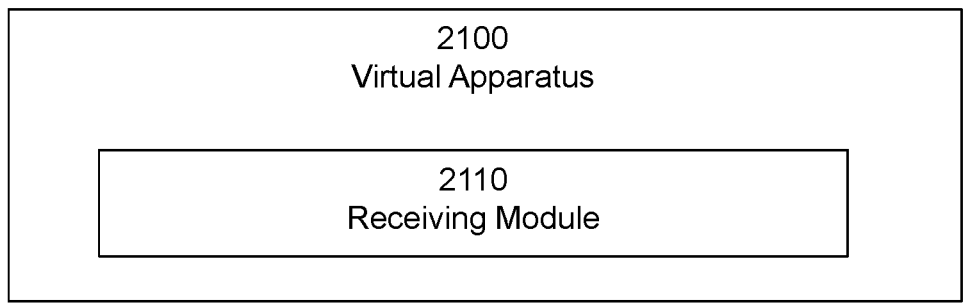
FIG. 27 illustrates another exemplary virtual computing device, according to certain embodiments.

FIG. 27 illustrates a schematic block diagram of a virtual apparatus 2100 in a wireless network (for example, the wireless network shown in FIG. 5). The apparatus may be implemented in a wireless device or network node (e.g., wireless device 110 or network node 160 shown in FIG. 5). Apparatus 2100 is operable to carry out the example method described with reference to FIG. 26 and possibly any other processes or methods disclosed herein. It is also to be understood that the method of FIG. 26 is not necessarily carried out solely by apparatus 2100. At least some operations of the method can be performed by one or more other entities.

Virtual Apparatus 2100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving module 2110 and any other suitable units of apparatus 2100 to perform corresponding functions according one or more embodiments of the present disclosure.

According to certain embodiments, receiving module 2110 may perform certain of the receiving functions of the apparatus 2100. For example, after handover of a wireless device, receiving module 2110 may receive at least one MDT report from the wireless device 110. The at least one MDT report includes at least one MDT measurement logged and/or performed based on a MDT configuration for a MCG and a SCG. The MDT configuration is associated with the source cell prior to handover of the wireless device.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A method performed by a wireless device, the method comprising:
   receiving, from a network node, a Minimization of Drive Test, MDT, configuration for a master cell group, MCG, and a secondary cell group, SCG;
   while the wireless device is in an idle state or an inactive state and operating according to a first Radio Access Technology, RAT, logging MDT measurements for the MCG and the SCG based on the MDT configuration;
   after transitioning from the idle or inactive state to a connected state and after handover from a source cell associated with the first RAT to a target cell associated with a second RAT, transmitting at least one MDT report to a target network node associated with the target cell; and
   wherein the wireless device is in the inactive state or the idle state when a change to the MDT configuration is received, and wherein the SCG is not supported by the target cell, and the method further comprises at least one of:
      discarding the MDT measurements for the SCG;
      transmitting the MDT measurements for the SCG to a master network node for forwarding to a secondary node associated with the SCG; and
      transmitting the MDT measurements for the SCG to the master network node for forwarding to a TCE associated with the SCG.

2. The method of claim 1, wherein transmitting the at least one MDT report comprises transmitting a single report comprising MDT measurements for the MCG and MDT measurements for the SCG.

3. The method of claim 1, wherein receiving the MDT configuration for the MCG and the SCG comprises receiving at least one index identifying a first trace collection entity, TCE, for the MCG and the SCG.

4. The method of claim 1, wherein transmitting the at least one MDT report comprises:
   transmitting a first report comprising the MDT measurements for the MCG; and
   transmitting a second report comprising the MDT measurements for the SCG.

5. The method of claim 1, wherein receiving the MDT configuration for the MCG and the SCG comprises receiving a first index identifying a first TCE for the MCG and a second index identifying a second TCE for the SCG.

6. The method of claim 1, further comprising:
   receiving a change to the MDT configuration for the SCG, wherein the change to the MDT configuration for the SCG is received while the wireless device is performing MDT measurements for the SCG associated with the first RAT; and
   in response to receiving the change to the MDT configuration for the SCG, deleting the MDT measurements for the SCG, and
   wherein the at least one MDT report transmitted to the target network node does not include the MDT measurements for the SCG.

7. A wireless device comprising:
   processing circuitry configured to:
   receive, from a network node, a Minimization of Drive Test, MDT, configuration for a master cell group, MCG, and a secondary cell group, SCG;
   while the wireless device is in an idle state or an inactive state and operating according to a first Radio Access Technology, RAT, log MDT measurements for the MCG and for the SCG based on the MDT configuration;

after transitioning from the idle or inactive state to a connected state and after handover from a source cell associated with the first RAT to a target cell associated with a second RAT, transmit at least one MDT report to a target network node associated with the target cell; and wherein the wireless device is in the inactive state or the idle state when a change to the MDT configuration is received, and wherein the SCG is not supported by the target cell, and the processing circuitry is further configured to perform at least one of:
discard the MDT measurements for the SCG;
transmit the MDT measurements for the SCG to a master network node for forwarding to a secondary node associated with the SCG; and
transmit the MDT measurements for the SCG to the master network node for forwarding to a TCE associated with the SCG.

8. The wireless device of claim 7, wherein processing circuitry configured to transmit the at least one MDT report comprises processing circuitry configured to transmit a single report comprising MDT measurements for the MCG and MDT measurements for the SCG.

9. The wireless device of claim 7, wherein processing circuitry configured to receive the MDT configuration for the MCG and the SCG comprises processing circuitry configured to receive at least one index identifying a first trace collection entity, TCE, for the MCG and the SCG.

10. The wireless device of claim 7, wherein processing circuitry configured to transmit the at least one MDT report comprises processing circuitry configured to:
transmit a first report comprising the MDT measurements for the MCG; and
transmit a second report comprising the MDT measurements for the SCG.

11. The wireless device of claim 7, wherein processing circuitry configured to receive the MDT configuration for the MCG and the SCG comprises processing circuitry configured to receive a first index identifying a first TCE for the MCG and a second index identifying a second TCE for the SCG.

12. The wireless device of claim 7, wherein the processing circuitry is further configured to:
receive a change to the MDT configuration for the SCG, wherein the change to the MDT configuration for the SCG is received while the wireless device is performing MDT measurements for the SCG associated with the first RAT; and
in response to receiving the change to the MDT configuration for the SCG, delete the MDT measurements for the SCG, and
wherein the at least one MDT report transmitted to the target network node does not include the MDT measurements for the SCG.

* * * * *